(12) United States Patent
Yang

(10) Patent No.: US 10,602,675 B2
(45) Date of Patent: Mar. 31, 2020

(54) PLANTING DEVICE AND MANUFACTURING METHOD THEREOF

(71) Applicant: Longtan Yang, Xiamen (CN)

(72) Inventor: Longtan Yang, Xiamen (CN)

( * ) Notice: Subject to any disclaimer, the term of this patent is extended or adjusted under 35 U.S.C. 154(b) by 151 days.

(21) Appl. No.: 15/591,079

(22) Filed: May 9, 2017

(65) Prior Publication Data
US 2018/0325042 A1 Nov. 15, 2018

(51) Int. Cl.
*A01G 9/02* (2018.01)
*A01G 9/029* (2018.01)

(52) U.S. Cl.
CPC ........... *A01G 9/0293* (2018.02); *A01G 9/028* (2013.01)

(58) Field of Classification Search
CPC .......... A01G 9/02; A01G 9/028; A01G 9/029; A01G 9/0291; A01G 27/00; A01G 9/0293; A01G 9/042; A01G 24/35; A01G 27/04
See application file for complete search history.

(56) References Cited

U.S. PATENT DOCUMENTS

| | | | | |
|---|---|---|---|---|
| 1,665,027 A * | 4/1928 | Haley | ...................... | A01G 9/02 425/469 |
| 3,680,256 A * | 8/1972 | Kusumi | ................. | A01G 9/029 47/84 |
| 4,439,950 A * | 4/1984 | Kelley | .................... | A01G 9/029 47/85 |
| 4,562,959 A * | 1/1986 | Pointer, Jr. | ............. | A01G 27/00 239/38 |
| 5,315,783 A * | 5/1994 | Peng | ...................... | A01G 27/00 47/31.1 |
| 6,035,578 A * | 3/2000 | Lo | ........................... | A01G 31/02 47/61 |
| 6,663,323 B1 * | 12/2003 | Boys | .................... | E02D 29/0225 405/262 |
| 6,874,278 B2 * | 4/2005 | Felknor | ................... | A01G 9/024 47/67 |
| 8,468,742 B2 * | 6/2013 | Morris | ................... | A01G 9/024 47/65.5 |
| 2007/0006527 A1 * | 1/2007 | Chen | ........................ | A01G 9/02 47/61 |
| 2007/0084107 A1 * | 4/2007 | Ganti | ....................... | A01G 9/02 47/39 |
| 2011/0023357 A1 * | 2/2011 | Ahmadi | .................... | A01G 9/02 47/65.7 |
| 2012/0159843 A1 * | 6/2012 | Whitcomb | ........ | A01G 13/0281 47/21.1 |
| 2017/0064910 A1 * | 3/2017 | Newton | ................. | A01G 9/028 |
| 2018/0084743 A1 * | 3/2018 | Thomas | ................. | A01G 27/02 |

* cited by examiner

*Primary Examiner* — Christopher D Hutchens
(74) *Attorney, Agent, or Firm* — Leong C. Lei

(57) ABSTRACT

A planting device includes an outer shell and an inner shell. The outer shell has a closed first cavity therein. The inner shell is disposed in the first cavity. The inner shell is formed with a second cavity having an opening. The second cavity is filled with soil. Plant seeds are placed in the soil. The opening of the second cavity is sealed with a first water-permeable layer. A side wall of the first cavity, opposite the opening of the second cavity, is a seepage layer. A retaining wall is provided around an outer side of the seepage layer to form a water storage trough. A method for manufacturing the planting device is provided. The planting device enables plants to grow out of the shell from a closed cavity, reducing the soil pollution to the environment and the impact on human health. It is convenient for planting, just watering.

12 Claims, 51 Drawing Sheets

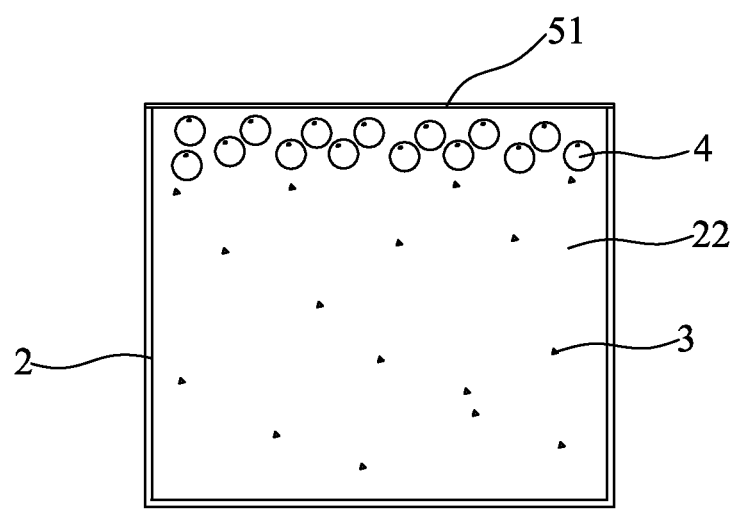
F I G. 2d

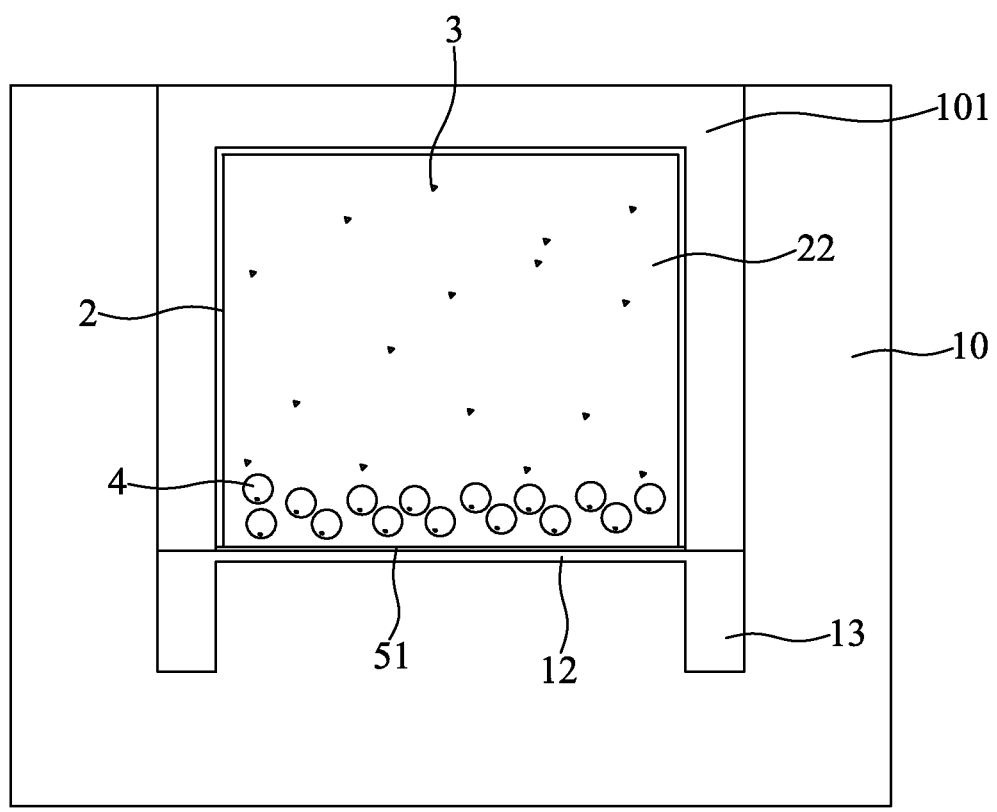
F I G. 2f

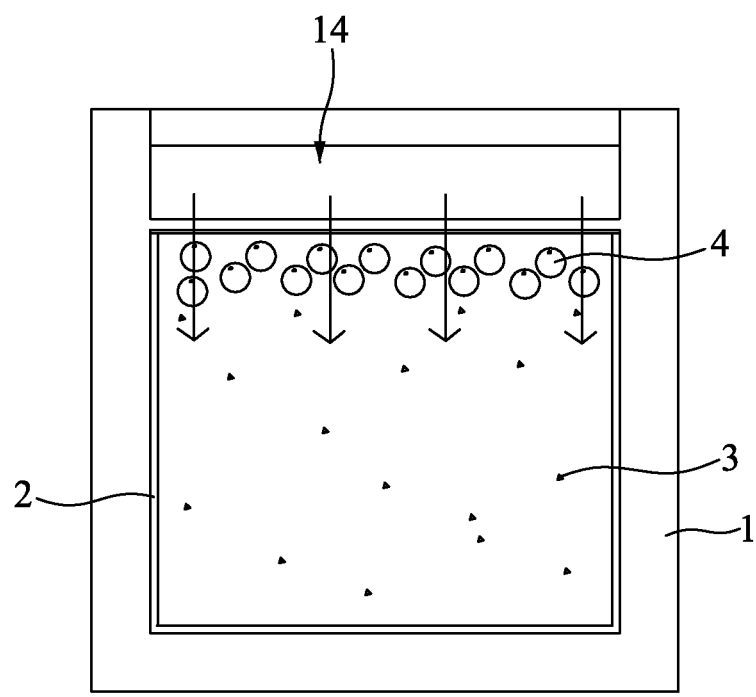
F I G. 3a
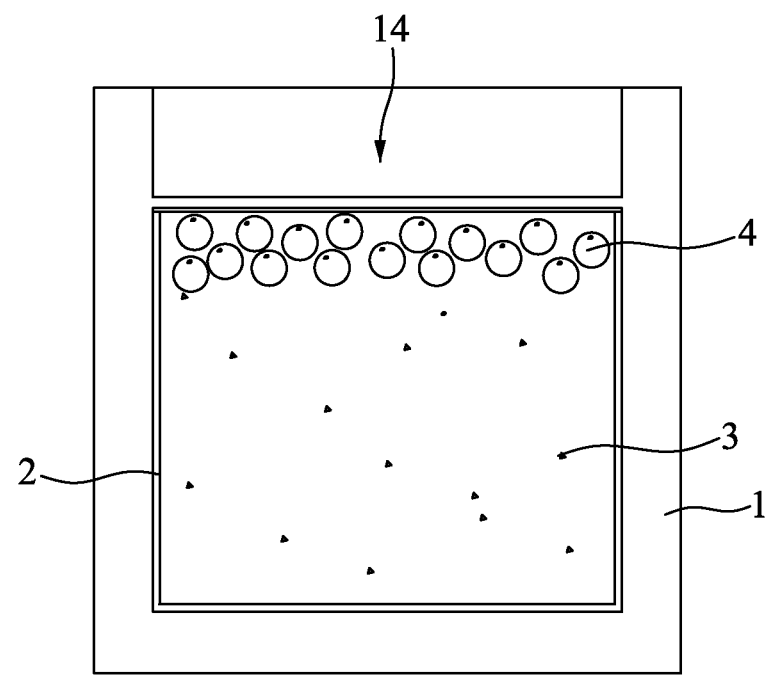
F I G. 3b

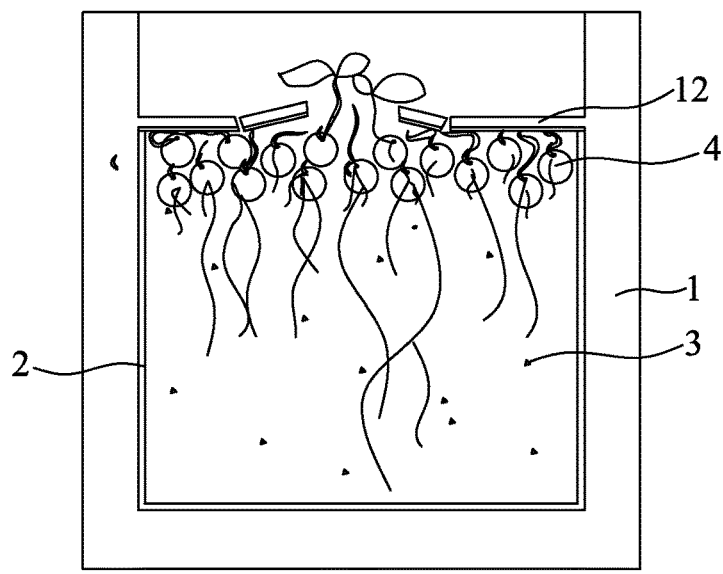
F I G. 3c
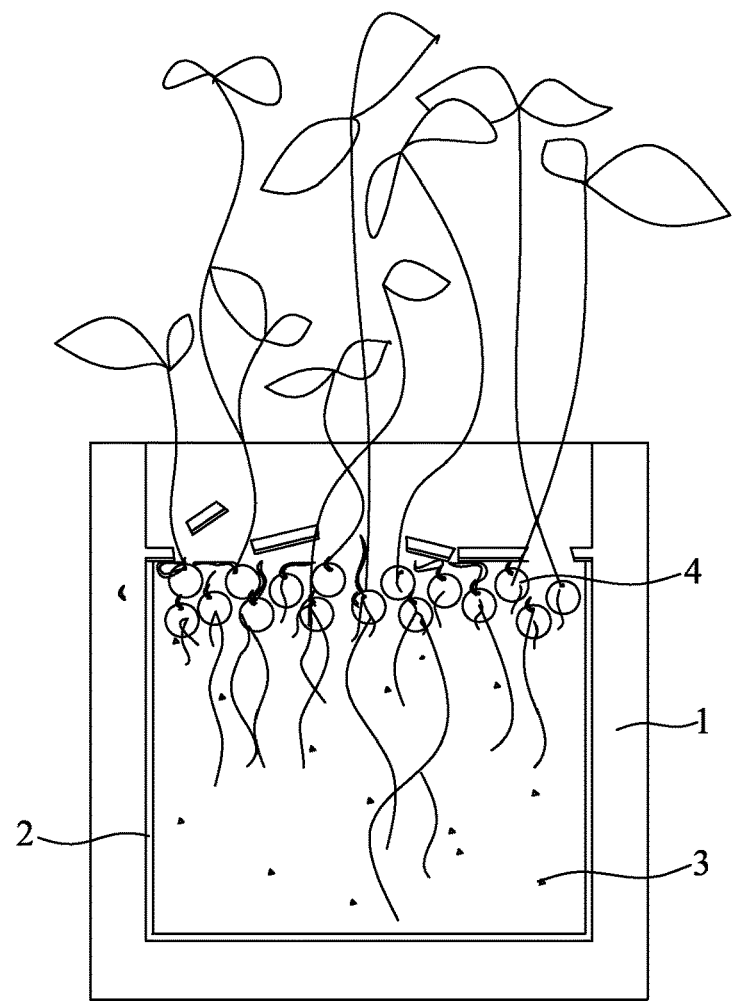
F I G. 3d

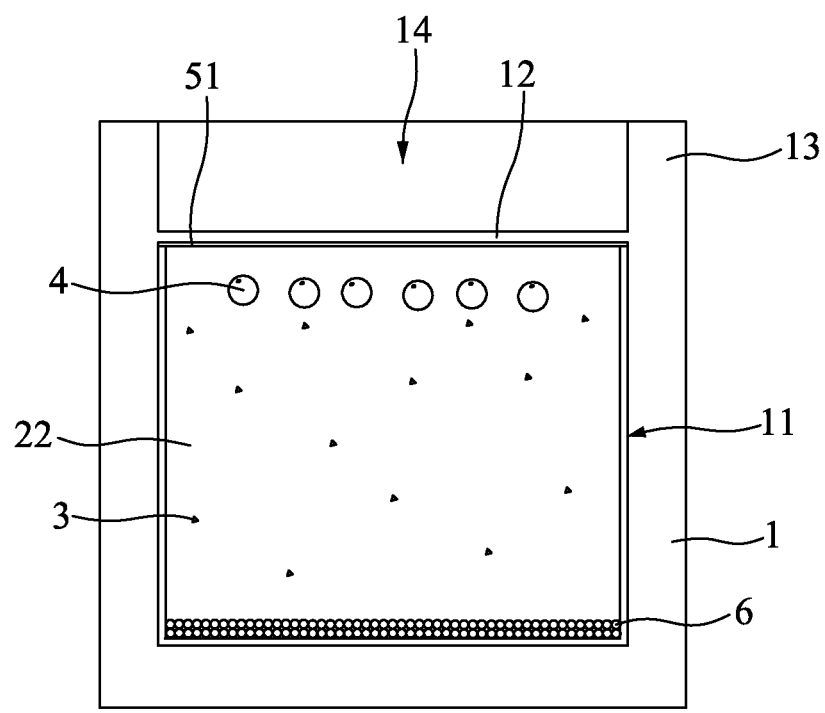
F I G. 4
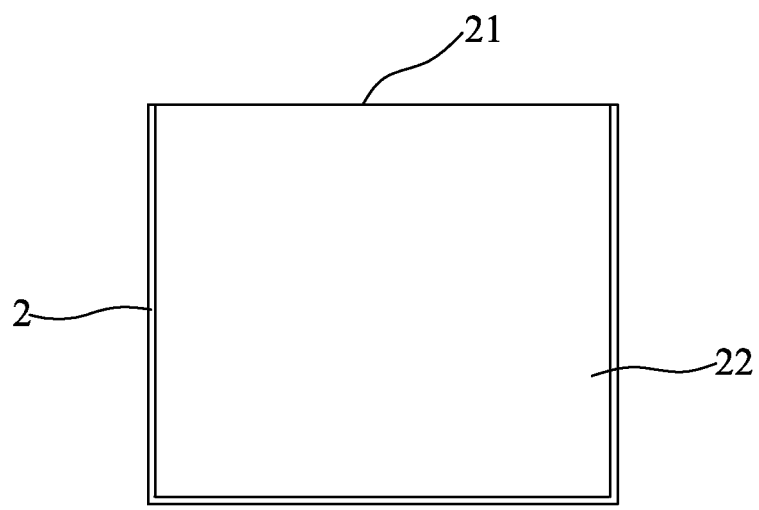
F I G. 5a

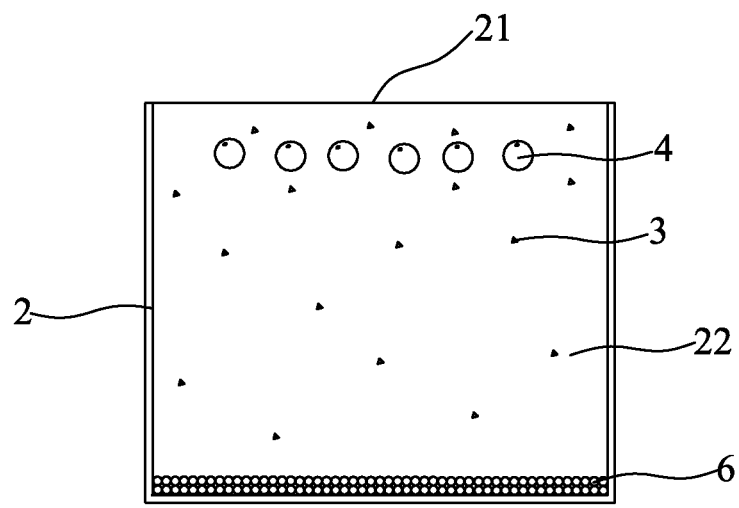
F I G. 5d
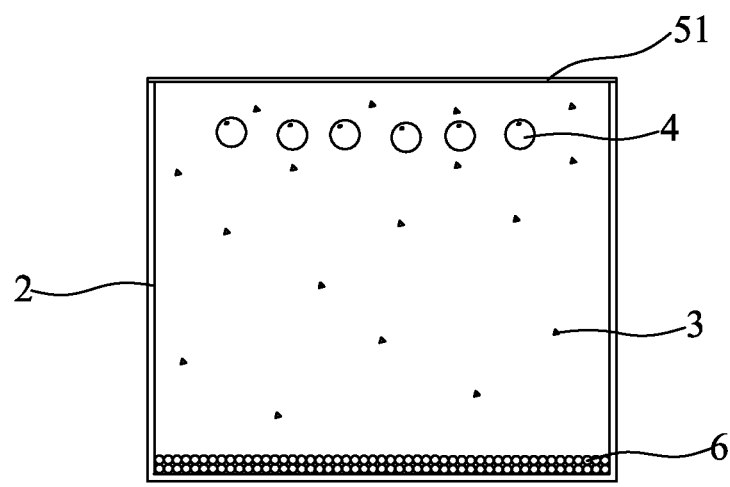
F I G. 5e

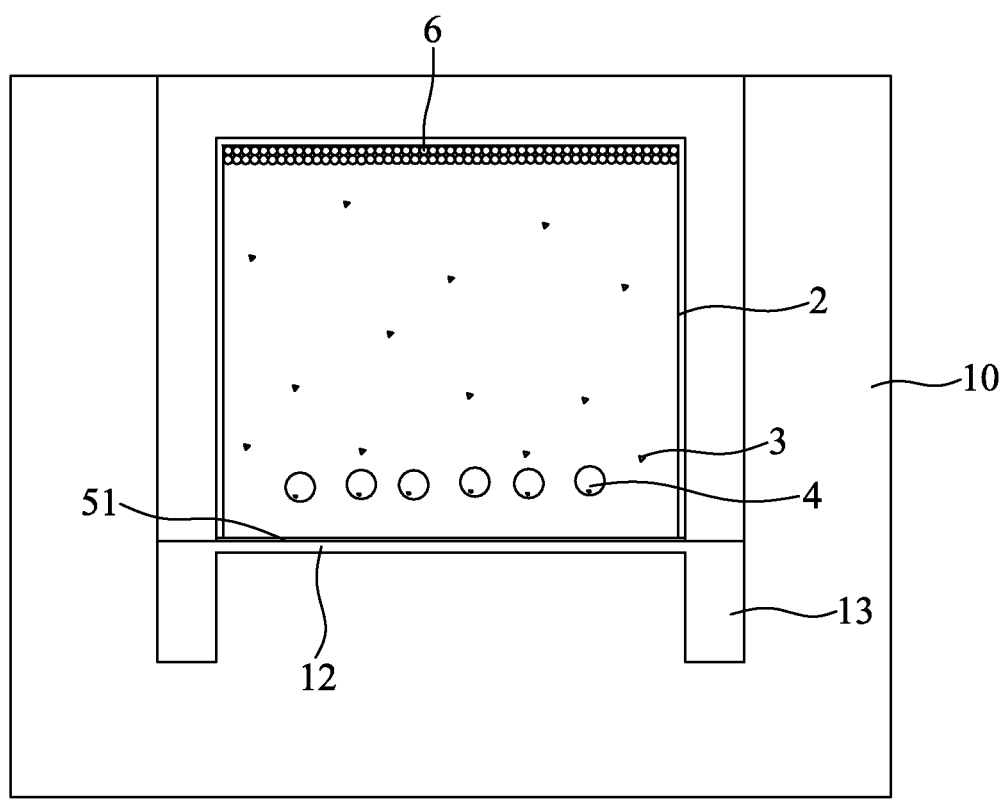
F I G. 5g

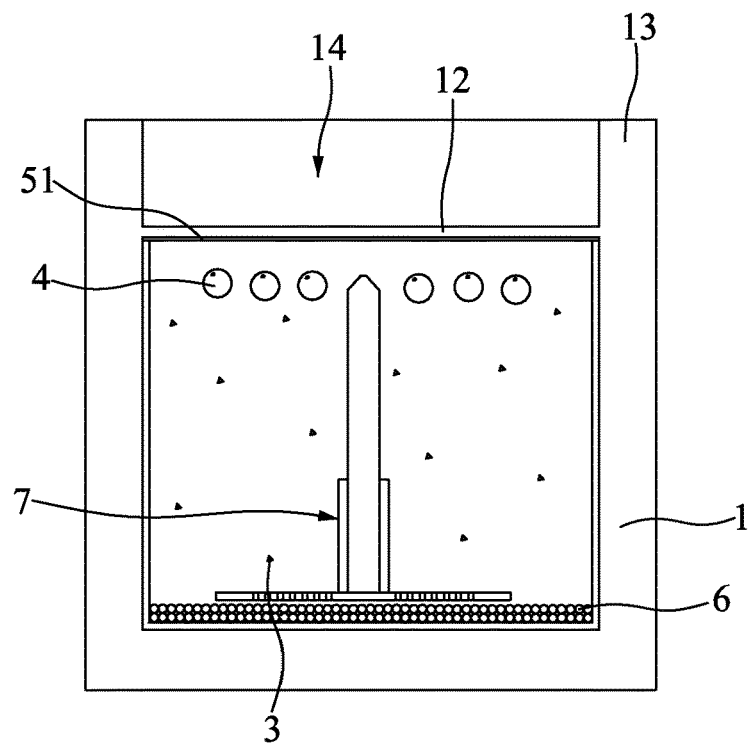
F I G. 7
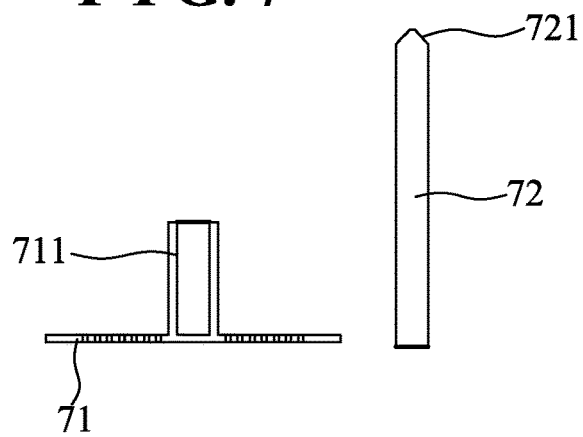
F I G. 8a
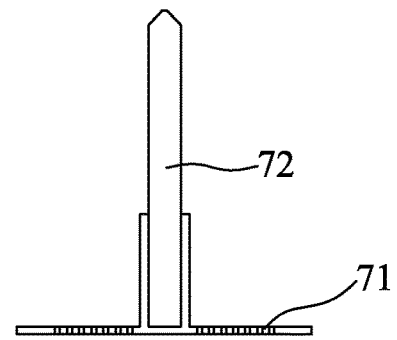
F I G. 8b

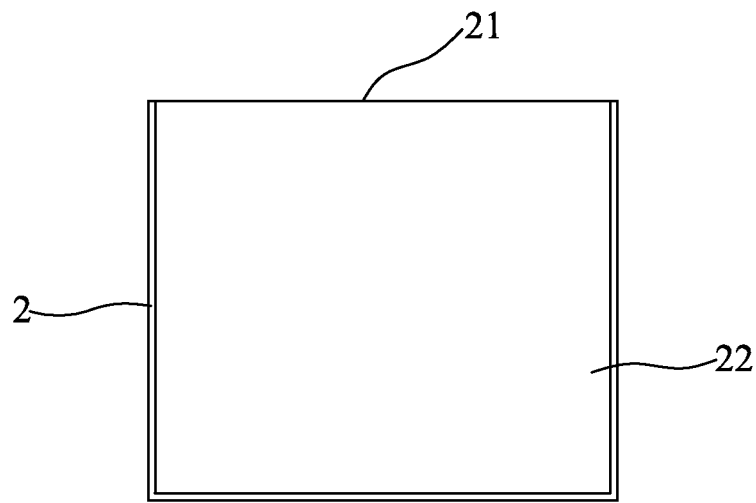
F I G. 9a
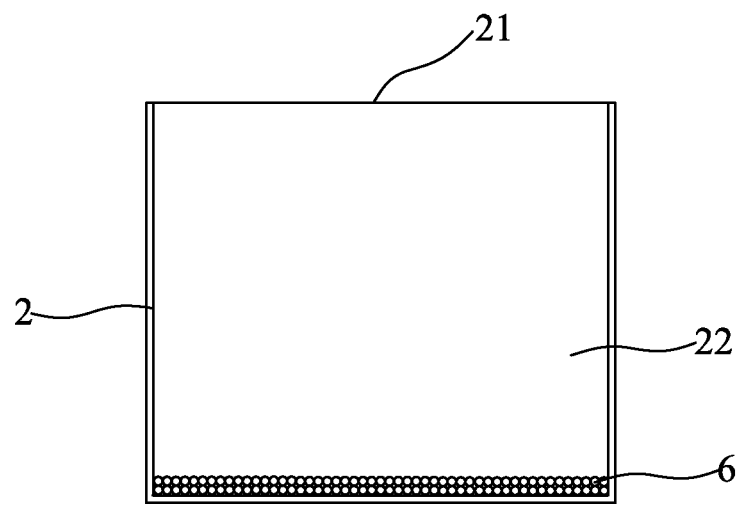
F I G. 9b

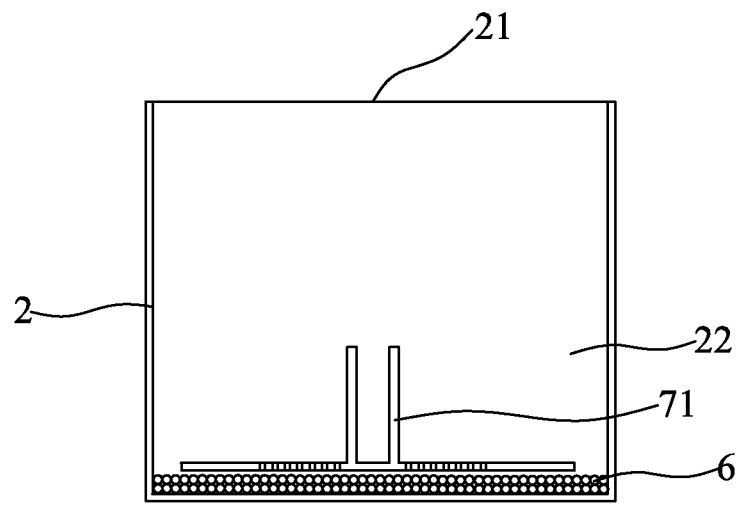
F I G. 9c
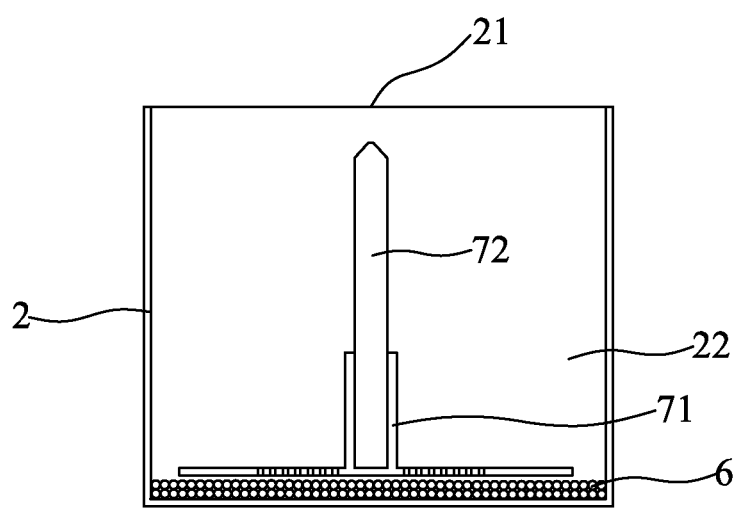
F I G. 9d

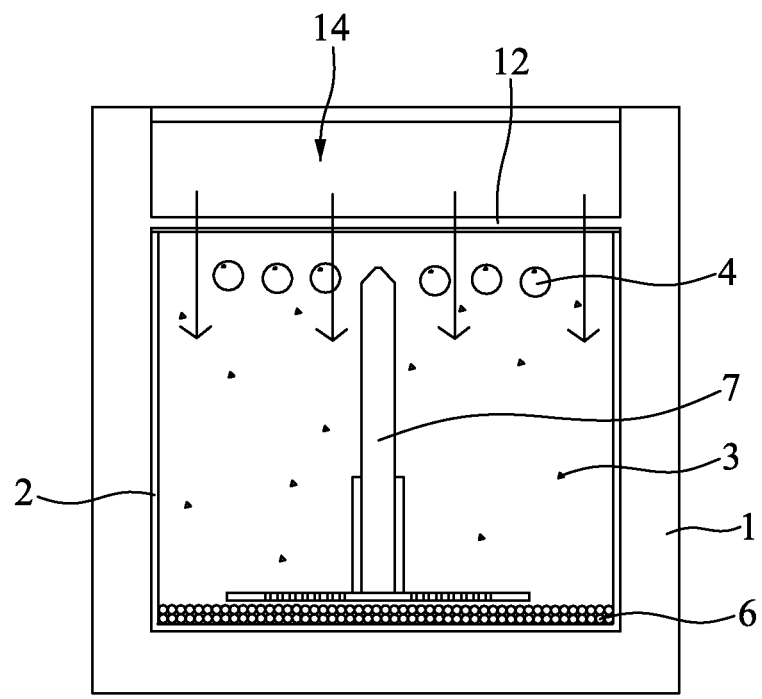
F I G. 10a
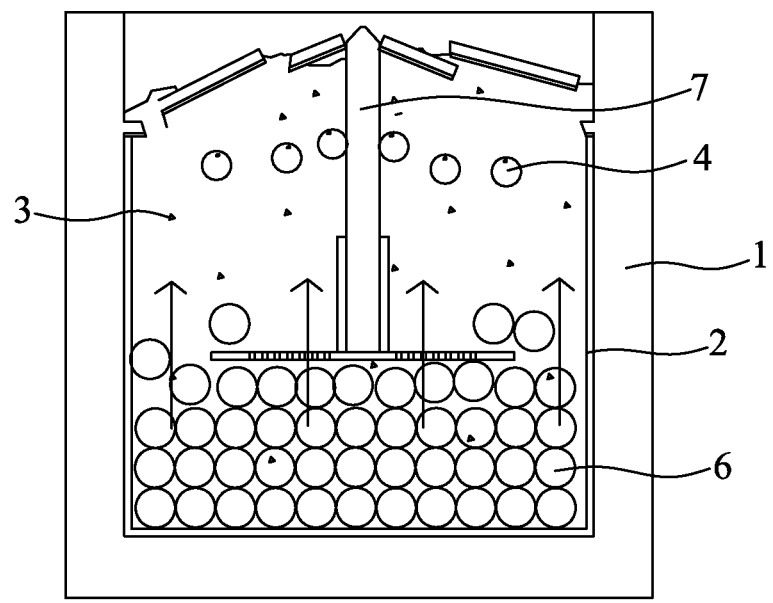
F I G. 10b

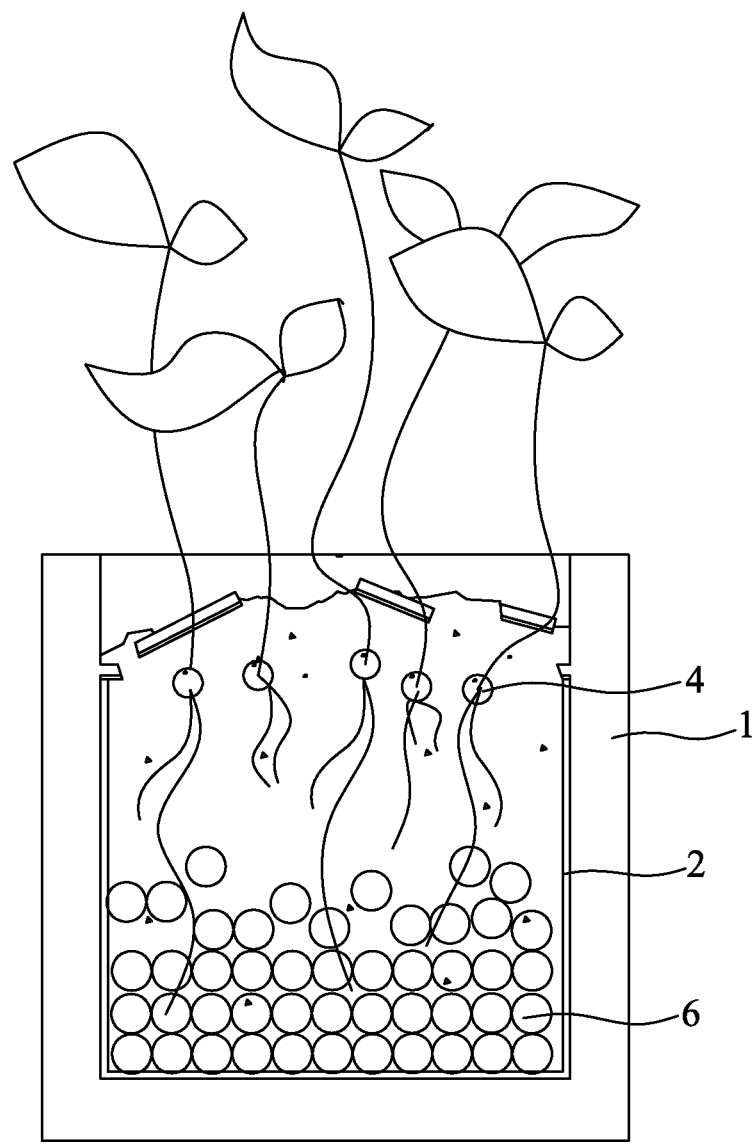
F I G. 10d

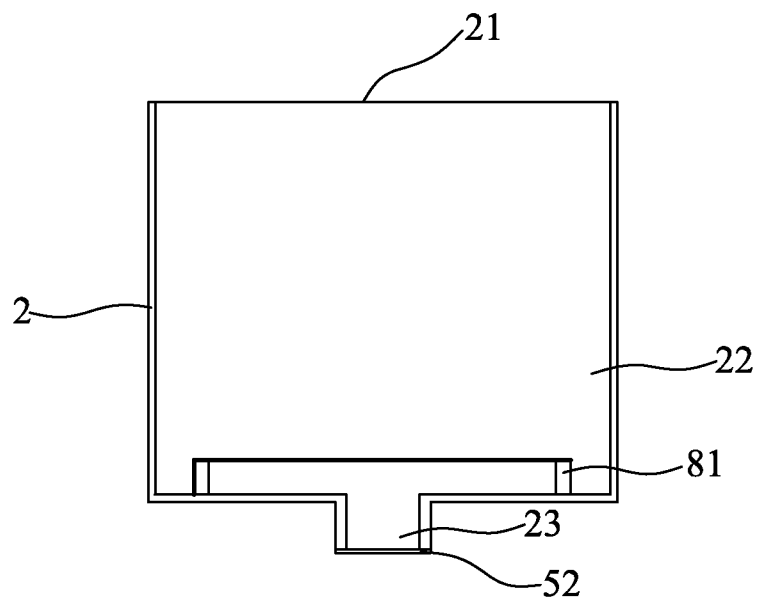
F I G. 13c
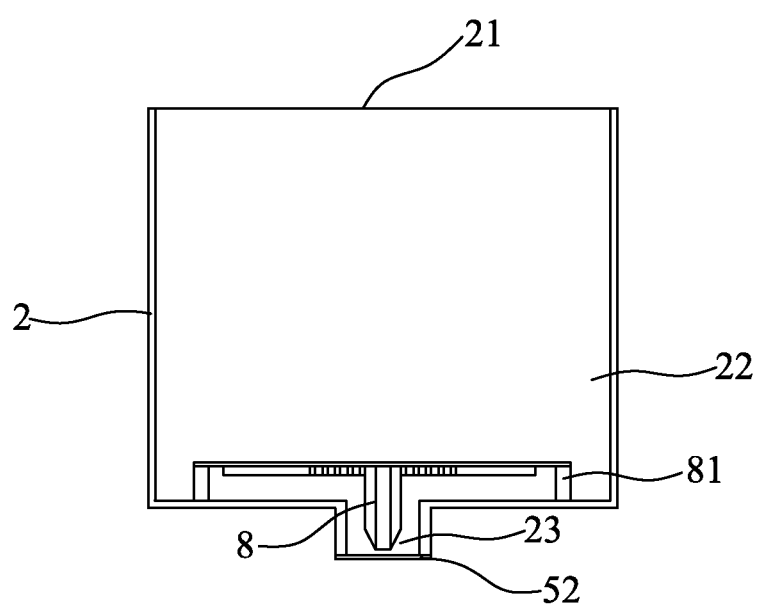
F I G. 13d

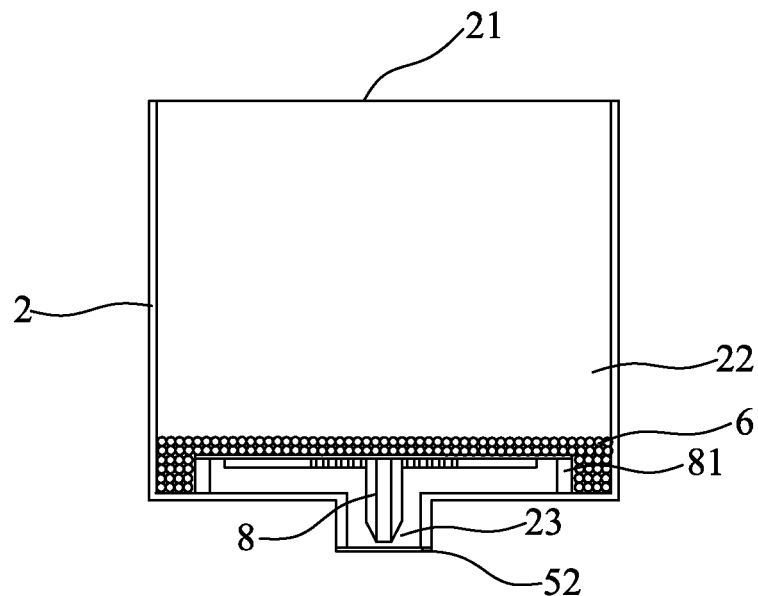
F I G. 13e
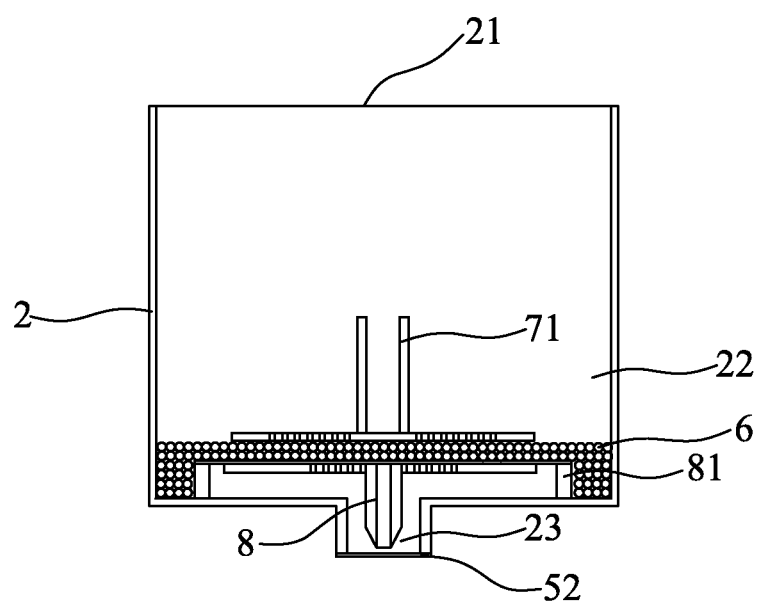
F I G. 13f

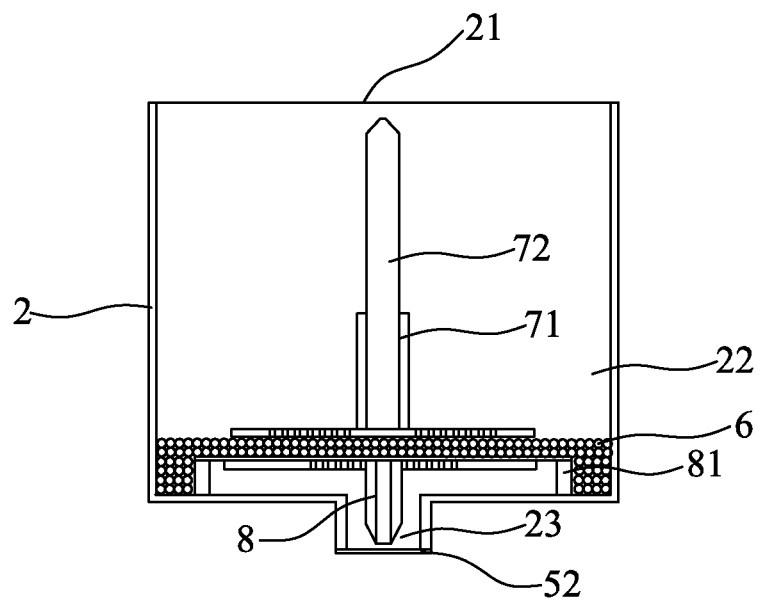
F I G. 13g
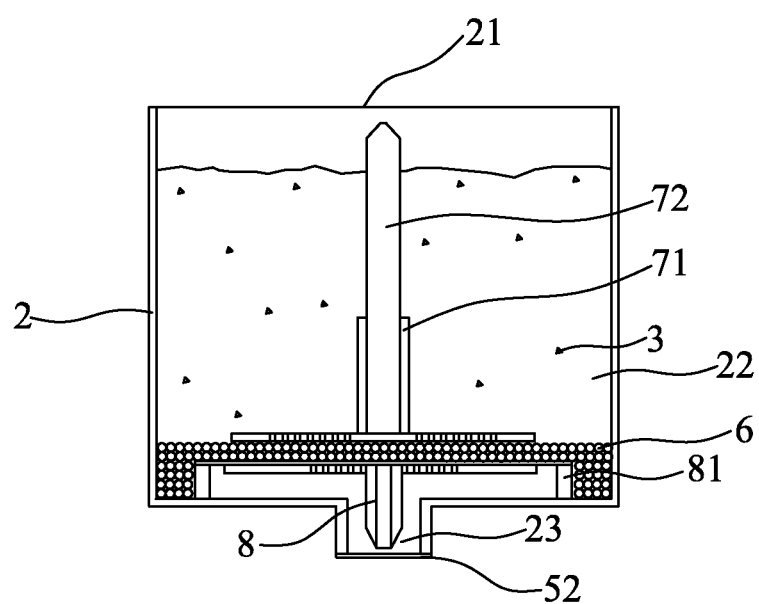
F I G. 13h

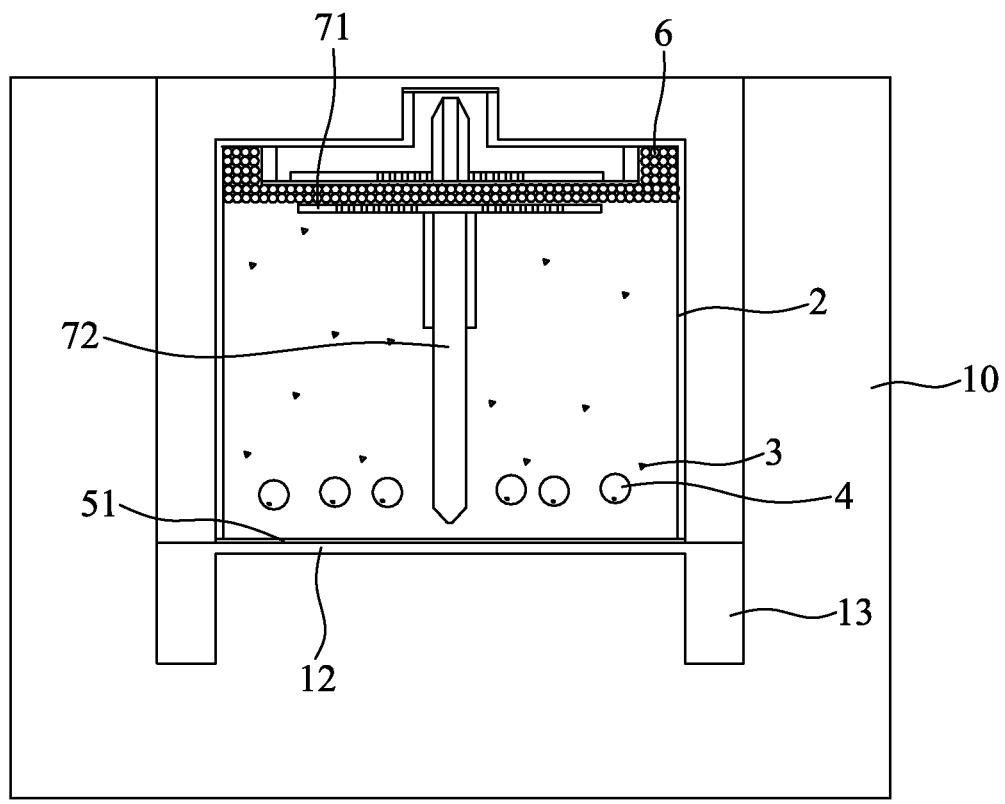
F I G. 13l

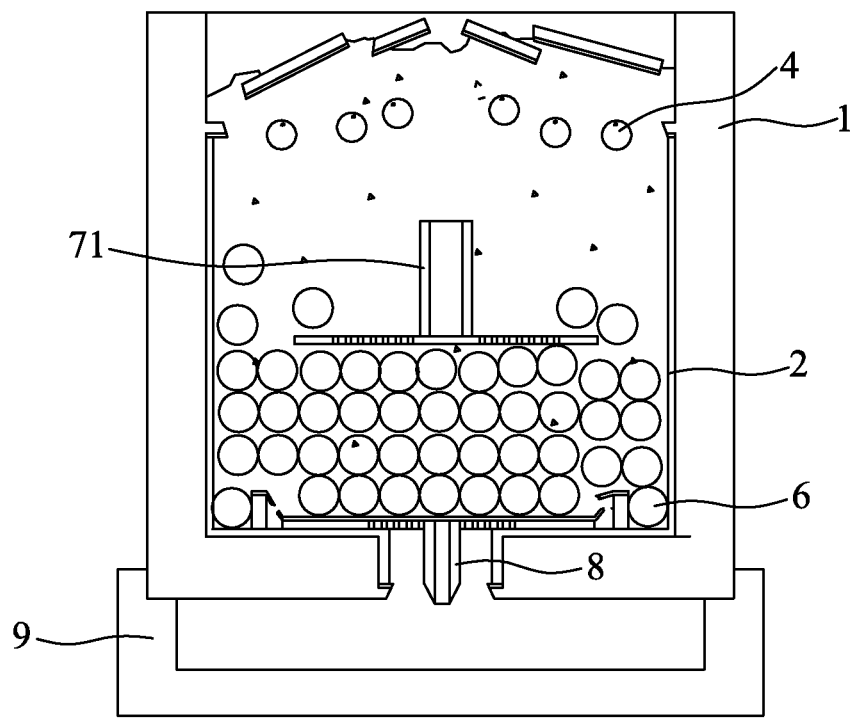
F I G. 14c
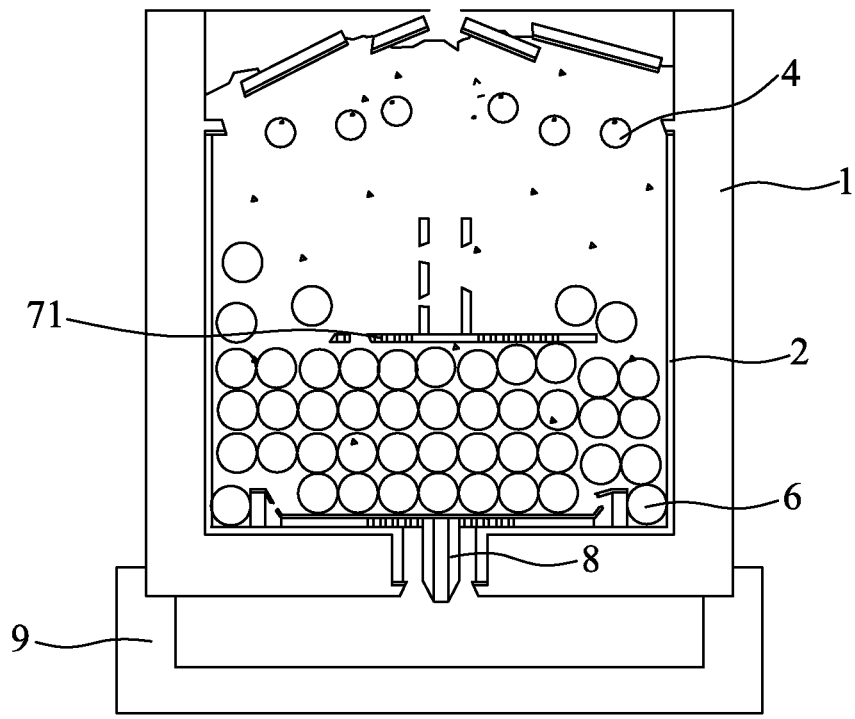
F I G. 14d

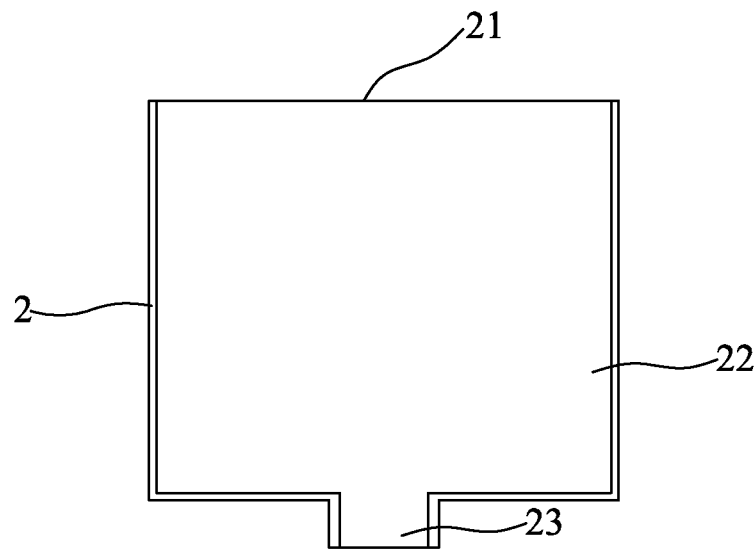
F I G. 17a
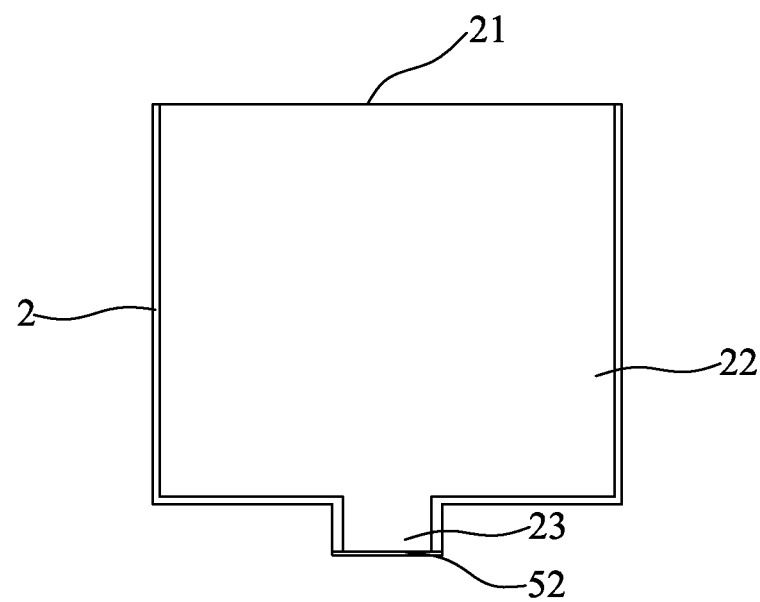
F I G. 17b

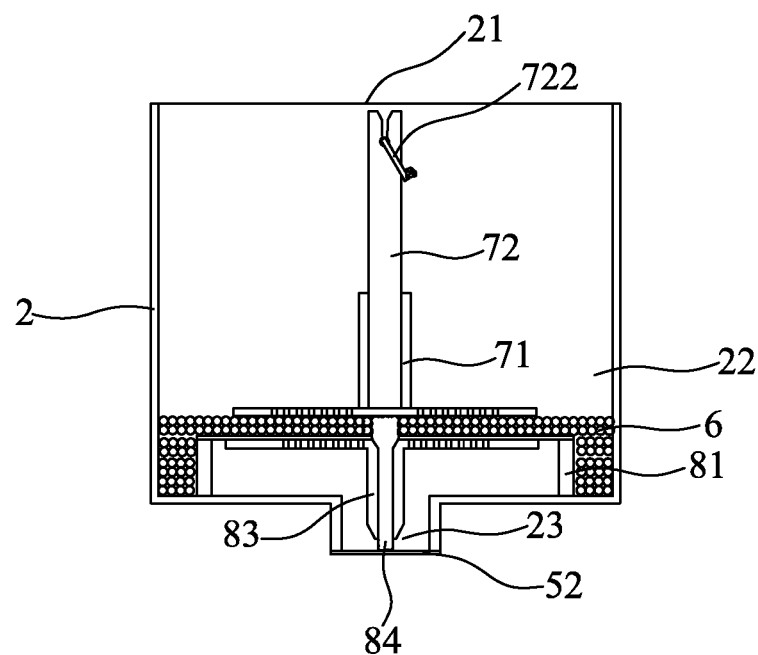
F I G. 17g
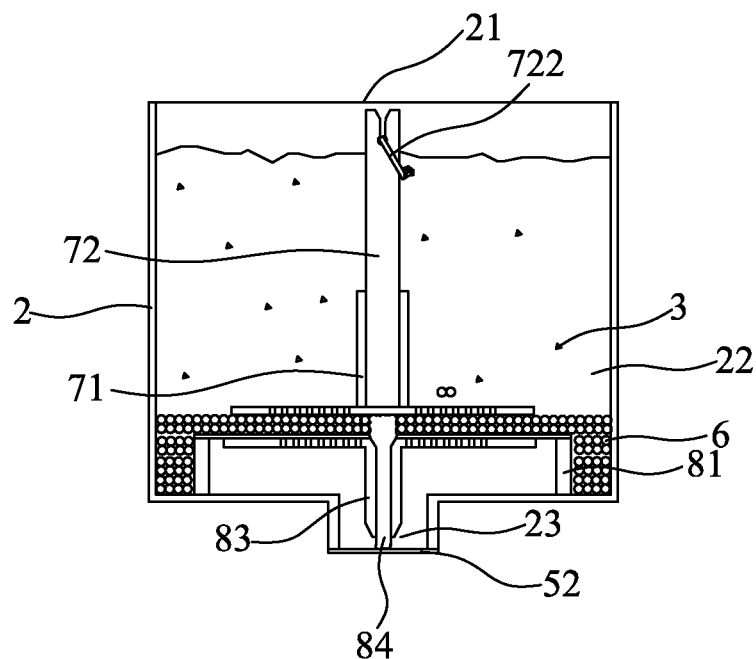
F I G. 17h

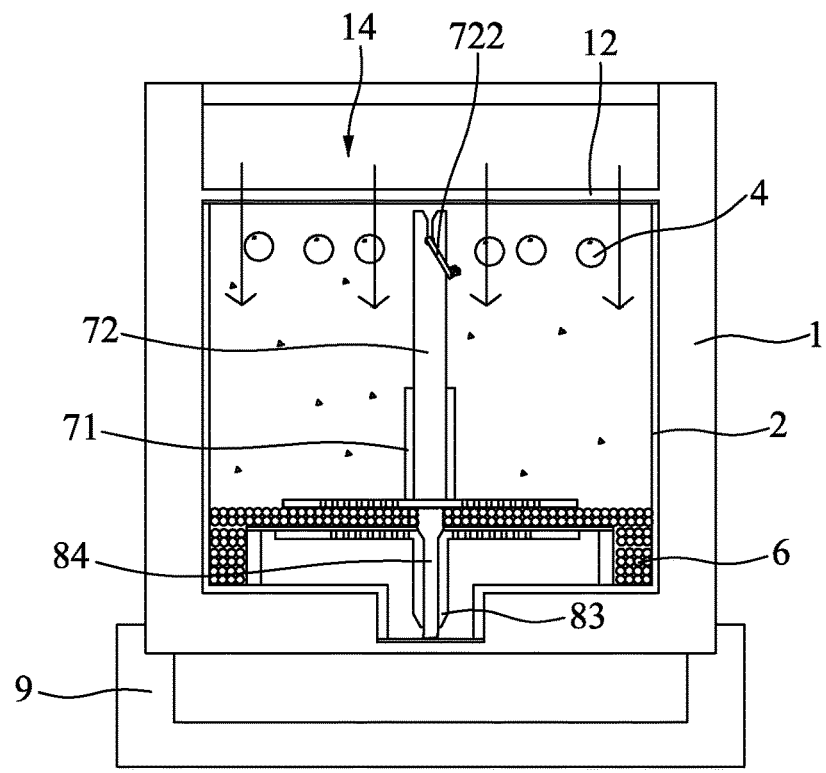
F I G. 18a
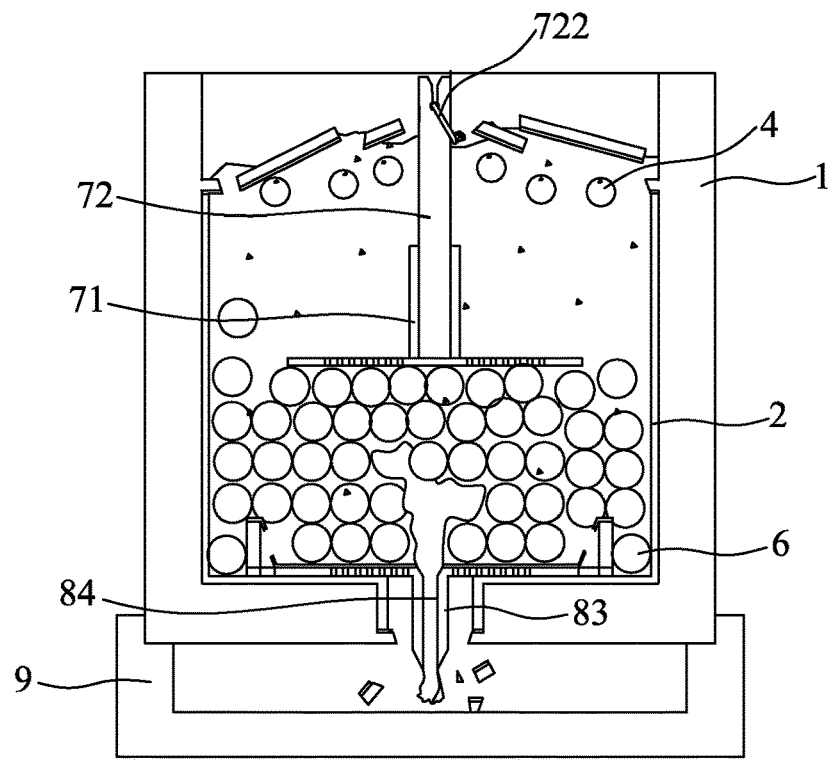
F I G. 18b

PLANTING DEVICE AND MANUFACTURING METHOD THEREOF

FIELD OF THE INVENTION

The present invention relates to the plant potting technology, and more particularly to a planting device and a manufacturing method thereof.

BACKGROUND OF THE INVENTION

Plant potting has been popular for the house or office furnishings to relax, release stress or culture fun. In particular, the cultivation of plant seeds becomes more and more popular.

In the existing technology, the cultivation of plant seeds is generally carried out by providing a container. The container has an accommodation cavity with an opening. The accommodation cavity is filled with cultivated soil. Plant seeds are embedded in the soil in advance. Plant seeds needs watering from the opening for germination.

This cultivation is inconvenient. The accommodation cavity of the container is first filled with cultivated soil, and then plant seeds are embedded in the soil in advance. The soil is easy to spill and pollute the surrounding environment. The soil may have parasite ovum to affect human health. Accordingly, the present invention intends to provide a dual faucet structure for improving the shortcomings mentioned above.

SUMMARY OF THE INVENTION

The primary object of the present invention is to provide a planting device and a manufacturing method thereof. The planting device enables plants to grow out of the shell from a closed cavity, reducing the soil pollution to the environment and the impact on human health. It is convenient for planting, just watering. The present invention provides a magic effect that plants can grow out of a closed solid shell, with an amusement and eye-catching effect.

In order to achieve the aforesaid object, the planting device of the present invention comprises an outer shell and an inner shell. The outer shell is formed with a closed first cavity therein. The inner shell is disposed in the first cavity. The inner shell is formed with a second cavity having an opening. The second cavity is filled with soil. Plant seeds are placed in the soil. The opening of the second cavity is sealed with a first water-permeable layer. A side wall of the first cavity, opposite the opening of the second cavity, is a seepage layer. A retaining wall is provided around an outer side of the seepage layer to form a water storage trough.

Preferably, a bottom of the second cavity of the inner shell is provided with a water-absorbing expandable layer, and the soil is filled on the water-absorbing expandable layer.

Preferably, the water-absorbing expandable layer is made of a highly hydrophilic resin or compressed fibre-reinforced soil.

Preferably, the planting device further comprises a first shell-breaking structure. The first shell-breaking structure is disposed on the water-absorbing expandable layer. The first shell-breaking structure points to the seepage layer of the outer shell.

Preferably, the first shell-breaking structure is composed of a first tray and a first shell-breaking bar. The first tray is disposed on the water-absorbing expandable layer. The first shell-breaking bar is mounted on the first tray. The first shell-breaking bar points to the seepage layer of the outer shell.

Preferably, the first tray is provided with a first sleeve, and the first shell-breaking bar is inserted in the first sleeve.

Preferably, one end of the first shell-breaking bar, facing the seepage layer of the outer shell, is a pointed end.

Preferably, the planting device further comprises a second shell-breaking structure and a bracket. The second shell-breaking structure is mounted on the bracket. One side of the second shell-breaking structure points to a bottom of the first cavity of the outer shell and the bottom of the second cavity of the inner shell.

Another side of the second shell-breaking structure is provided with the water-absorbing expandable layer. The bracket is disposed at the bottom of the second cavity of the inner shell.

Preferably, the second shell-breaking structure is composed of a second tray, a second shell-breaking bar and a paper holder. The second shell-breaking bar is disposed on one side of the second tray. Another side of the second tray is fixed to the paper holder. The second shell-breaking bar points to the bottom of the first cavity of the outer shell and the bottom of the second cavity of the inner shell. The paper holder is secured on the bracket. The water-absorbing expandable layer is disposed on the paper holder.

Preferably, the bottom of the second cavity of the inner shell protrudes downward and is provided with a drain mouth. The drain mouth is sealed with a second water-permeable layer. The bottom of the first cavity of the outer shell is provided with a recess. The drain mouth of the inner shell is located in the recess of the outer shell. The second shell-breaking bar is located in the drain mouth of the inner shell.

Preferably, the planting device further comprises a water storage tray. The water storage tray is mounted to a lower portion of the outer shell, facing the second shell-breaking structure.

Preferably, the second shell-breaking bar has a hollow passage therein, and a fiber bar is inserted in the hollow passage.

Preferably, one end of the second shell-breaking bar, pointing to the bottom of the first cavity of the outer shell and the bottom of the second cavity of the inner shell, is a pointed end.

Preferably, one end of the first shell-breaking bar, pointing to the seepage layer of the outer shell, is provided with a pendant.

Preferably, the first water-permeable layer is made of paper or a water-permeable fiber material.

Preferably, the outer shell and the seepage layer are made of a cement material, a gypsum material, or a solid material having a certain water permeability.

Preferably, the inner shell is made of paperboard a fibrous synthetic material having strong water permeability.

A method for manufacturing a planting device comprises the steps of:
1. providing an inner shell having a second cavity with an opening;
2. filling the second cavity of the inner shell with soil;
3. placing plant seeds in the soil;
4. sealing the opening of the second cavity of the inner shell with a first water-permeable layer;
5. providing a mold having a cavity, wherein a recess is formed around a bottom of the cavity, slurry is poured into the cavity to cover a bottom of the cavity and the recess to form a seepage layer and a retaining wall around an outer side of the seepage layer after the slurry is solidified, and a water storage trough is formed between the retainer wall and the seepage layer;

6. placing the inner shell upside down in the cavity of the mold, wherein the first water-permeable layer of the inner shell faces the seepage layer, a gap is formed between a side portion of the inner shell and the cavity, and an upper portion of the inner shell is lower than a mouth portion of the cavity; and 7. pouring slurry into the gap between the side portion of the inner shell and the cavity until the inner shell is covered with the slurry, wherein the slurry after solidified and the seepage layer jointly form an outer shell.

Preferably, in step 2, a water-absorbing expandable layer is first placed on a bottom of the second cavity of the inner shell, and the soil is filled on the water-absorbing expandable layer.

Preferably, in step 2, a water-absorbing expandable layer is first placed on a bottom of the second cavity of the inner shell, a first shell-breaking structure is provided on the water-absorbing expandable layer, and the soil is filled on the first shell-breaking structure.

Preferably, the first shell-breaking structure is composed of a first tray and a first shell-breaking bar. The first tray is disposed on the water-absorbing expandable layer. The first shell-breaking bar is mounted on the first tray.

Preferably, in step 1, a bottom of the second cavity of the inner shell protrudes downward and is provided with a drain mouth. The drain mouth is sealed with a second water-permeable layer. A bracket is provided at the bottom of the second cavity of the inner shell. A second shell-breaking structure is mounted on the bracket. One side of the second shell-breaking structure points to the bottom of the second cavity of the inner shell. A water-absorbing expandable layer is provided on another side of the second shell-breaking structure.

Preferably, the second shell-breaking structure is composed of a second tray, a second shell-breaking bar and a paper holder. The second shell-breaking bar is disposed on one side of the second tray. Another side of the second tray is fixed to the paper holder. The second shell-breaking bar points to the bottom of the second cavity of the inner shell. The paper holder is secured on the bracket. The water-absorbing expandable layer is disposed on the paper holder.

Preferably, in step 1, a bottom of the second cavity of the inner shell protrudes downward and is provided with a drain mouth. The drain mouth is sealed with a second water-permeable layer. A bracket is provided at the bottom of the second cavity of the inner shell. The second shell-breaking structure is composed of a second tray, a second shell-breaking bar and a paper holder. The second shell-breaking bar is disposed on one side of the second tray. Another side of the second tray is fixed to the paper holder. The paper holder is secured on the bracket. The water-absorbing expandable layer is disposed on the paper holder. The second shell-breaking bar points to the bottom of the second cavity of the inner shell. The second shell-breaking bar has a hollow passage therein. A fiber bar is inserted in the hollow passage.

Preferably, in step 2, a water-absorbing expandable layer is first provided on a second shell-breaking structure. A first shell-breaking structure is provided on the water-absorbing expandable layer. The first shell-breaking structure is composed of a first tray and a first shell-breaking bar. The first tray is disposed on the water-absorbing expandable layer. The first shell-breaking bar is mounted on the first tray. The first shell-breaking bar points to the seepage layer of the outer shell. One end of the first shell-breaking bar, pointing to the seepage layer of the outer shell, is provided with a pendant.

The outer shell of the present invention is formed with the closed first cavity. The inner shell is disposed in the first cavity. The inner shell is formed with the second cavity having the opening. The second cavity is filled with the soil. The plant seeds are placed in the soil. For planting, the water is poured into the water storage trough, and then the water is infiltrated through the seepage layer and the first-permeable layer into the soil 3 in the second cavity of the inner shell. After germination, the plant seeds absorb the water to grow so that the first-permeable layer and the seepage layer are broken, alternatively, the shell-breaking structure is provided to break the first-permeable layer and the seepage layer. The planting device enables plants to grow out of the shell from a closed cavity, reducing the soil pollution to the environment and the impact on human health. It is convenient for planting, just watering. Through the auxiliary shell-breaking structure, the plating device can be used for most of plant seeds.

BRIEF DESCRIPTION OF THE DRAWINGS

FIGS. 2a to 2g illustrate the manufacturing method in accordance with the first embodiment of the present invention;

FIGS. 3a to 3d are schematic views of plant planting according to the first embodiment of the present invention;

FIG. 4 is a structural schematic view in accordance with a second embodiment of the present invention;

FIGS. 5a to 5h illustrate the manufacturing method in accordance with the second embodiment of the present invention;

FIG. 7 is a structural schematic view in accordance with a third embodiment of the present invention;

FIG. 8a is an exploded view of the first shell-breaking structure in accordance with the third embodiment of the present invention;

FIG. 8b is an assembled view of the first shell-breaking structure in accordance with the third embodiment of the present invention;

FIGS. 9a to 9j illustrate the manufacturing method in accordance with the third embodiment of the present invention;

FIGS. 10a to 10d are schematic views of plant planting according to the third embodiment of the present invention;

FIGS. 13a to 13m illustrate the manufacturing method in accordance with the fourth embodiment of the present invention;

FIGS. 14a to 14e are schematic views of plant planting according to the fourth embodiment of the present invention;

FIGS. 17a to 17m illustrate the manufacturing method in accordance with the fifth embodiment of the present invention; and FIGS. 18a to 18e are schematic views of plant planting according to the fifth embodiment of the present invention.

DETAILED DESCRIPTION OF THE PREFERRED EMBODIMENTS

Embodiments of the present invention will now be described, by way of example only, with reference to the accompanying drawings.

Figure 1:
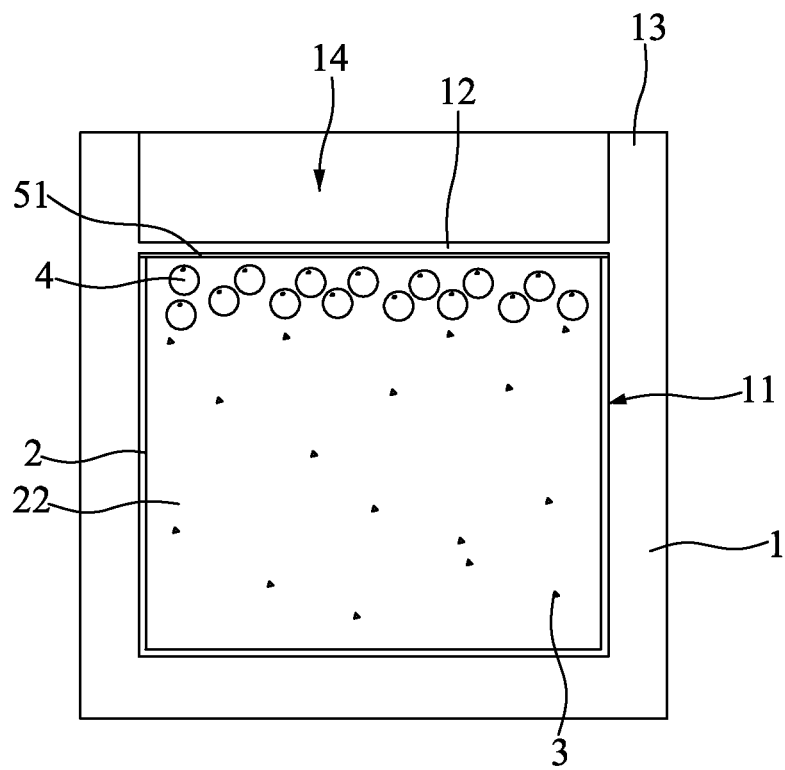
FIG. 1 is a structural schematic view in accordance with a first embodiment of the present invention.

FIG. 1 to FIG. 3d illustrates a planting device according to a first embodiment of the present invention. The planting device comprises an outer shell 1 and an inner shell 2. The outer shell 1 is formed with a closed first cavity 11 therein. The inner shell 2 is placed in the first cavity 11. The inner shell 2 is formed with a second cavity 22 having an opening 21. As shown in FIG. 2a, the second cavity 22 is filled with soil 3. Plant seeds 4 are placed in the soil 3. The opening 21 of the second cavity 22 is sealed with a first water-permeable layer 51. A side wall of the first cavity 11, opposite the opening 21 of the second cavity 22, is a seepage layer 12. A retaining wall 13 is provided around an outer side of the seepage layer 12 to form a water storage trough 14, as shown in FIG. 1.

In this embodiment, the first water-permeable layer 51 is made of paper. The outer shell 1 and the seepage layer 12 are made of cement or gypsum. The inner shell 2 is made of paperboard or a fibrous synthetic material. The inner shell 2 is generally made of a material having strong water permeability.

Figure 2A:
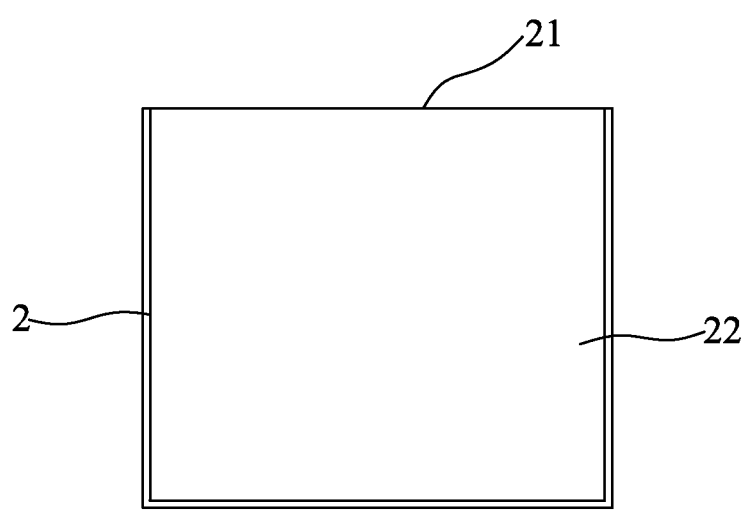

FIG. 2a to FIG. 2g illustrates a method for manufacturing a planting device in accordance with the first embodiment of the present invention. The method comprises the steps of:

1. as shown in FIG. 2a, providing an inner shell 2 having a second cavity 22 with an opening 21, wherein the inner shell 2 is generally made of a material having a strong water permeability, such as paperboard, a fibrous synthetic material, and the like.

Figure 2B:
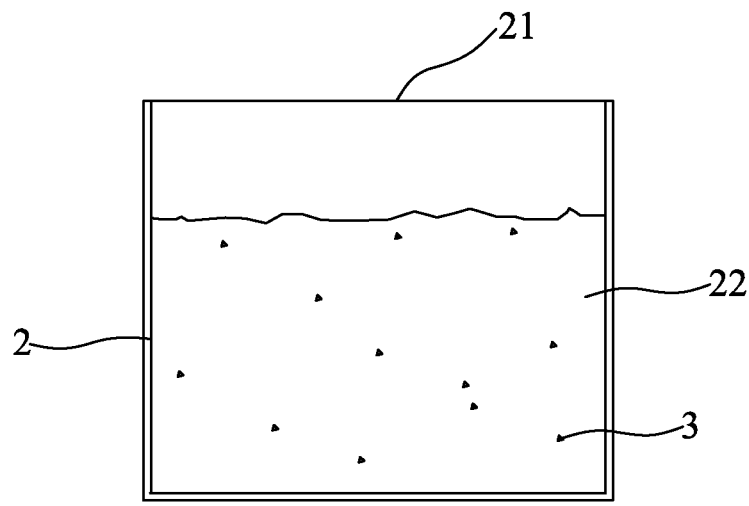

2. as shown in FIG. 2b, filling the second cavity 22 of the inner shell with soil 3, wherein the soil 3 is dry soil and the space for seeds is reserved.

Figure 2C:
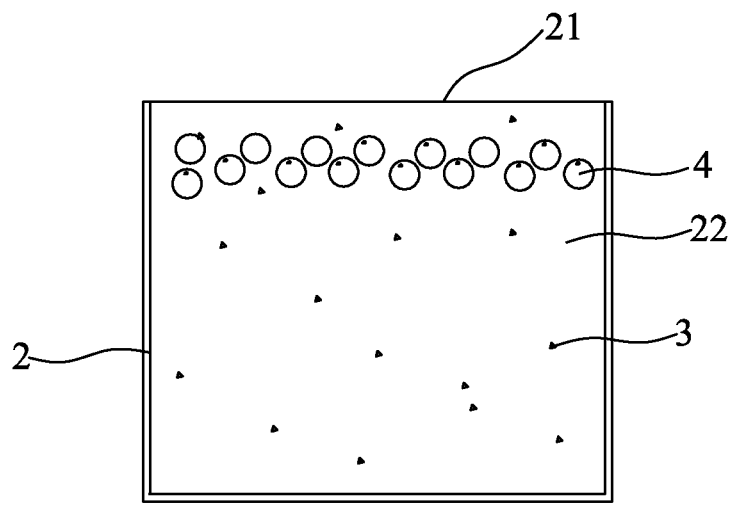

3. as shown in FIG. 2c, placing plant seeds 4 in the soil 3, wherein when the second cavity 22 is filled with the soil 3 up to a certain height, a sufficient amount of plant seeds 4 having good germination potential is placed into the soil 3, and then the remaining space of the second cavity 22 is filled with the soil 3, wherein the seeds must be enough, and the seeds must be very strong and have great germinating energy, such as a variety of beans, wheat seeds, etc., if the seeds are few or the germinating energy is weak, the seeds will not be able to successfully break the shell.

4. as shown in FIG. 2d, sealing the opening 21 of the second cavity 22 of the inner shell 2 with a first water-permeable layer 51, wherein the opening 21 is usually sealed with paper having better water permeability so that the soil 3 and the plant seeds 4 do not fall out.

Figure 2E:
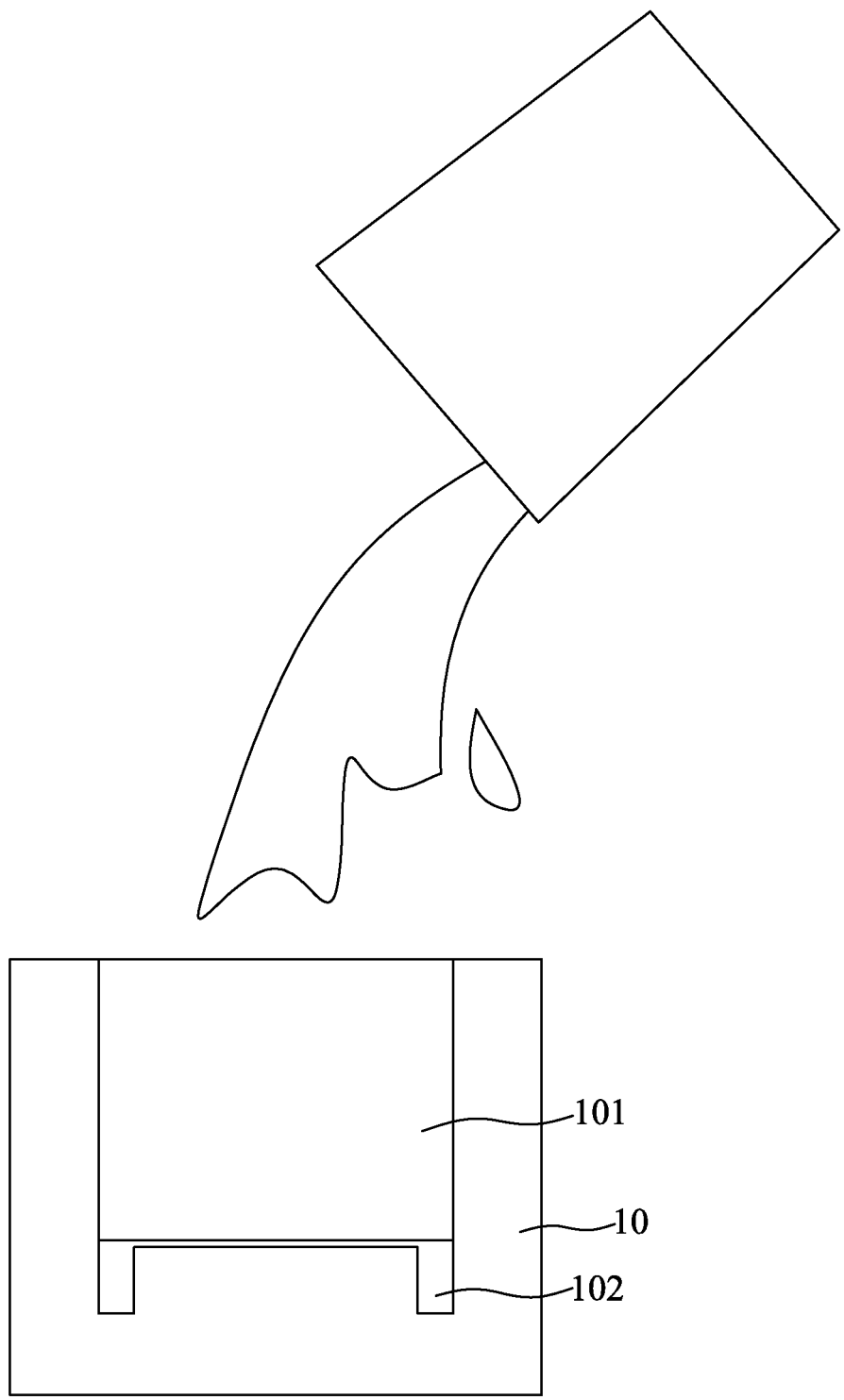

5. as shown in FIG. 2e, providing a mold 10 having a cavity 101, wherein a recess 102 is formed around a bottom of the cavity 101, slurry is poured into the cavity 101 to cover the bottom of the cavity 101 and the recess 102 to form a seepage layer 12 and a retaining wall 13 around an outer side of the seepage layer 12 after the slurry is solidified, and a water storage trough 14 is formed between the retainer wall 13 and the seepage layer 12.

An appropriate amount of slurry is poured into the mold 10 to control an appropriate thickness of between 1 mm and 2 mm. The material of the outer shell 1 can be gypsum slurry, cement paste, or other different degradable environmentally friendly materials. The requirement for the material is strong water permeability and non-toxic and harmless to human and plant. The thickness of the seepage layer 12 of the outer shell 1 is usually controlled at 1 mm to 2.5 mm. The strength of the different materials is different, so that the thickness is not the same. The cement is harder than the gypsum, so the thickness should be appropriately reduced.

6. As shown in FIG. 2f, placing the inner shell 2 upside down in the cavity 101 of the mold 10, wherein the first water-permeable layer 51 of the inner shell 2 faces the seepage layer 12, a gap is formed between a side portion of the inner shell 2 and the cavity 101, and an upper portion of the inner shell 2 is lower than a mouth portion of the cavity 101.

Figure 2G:
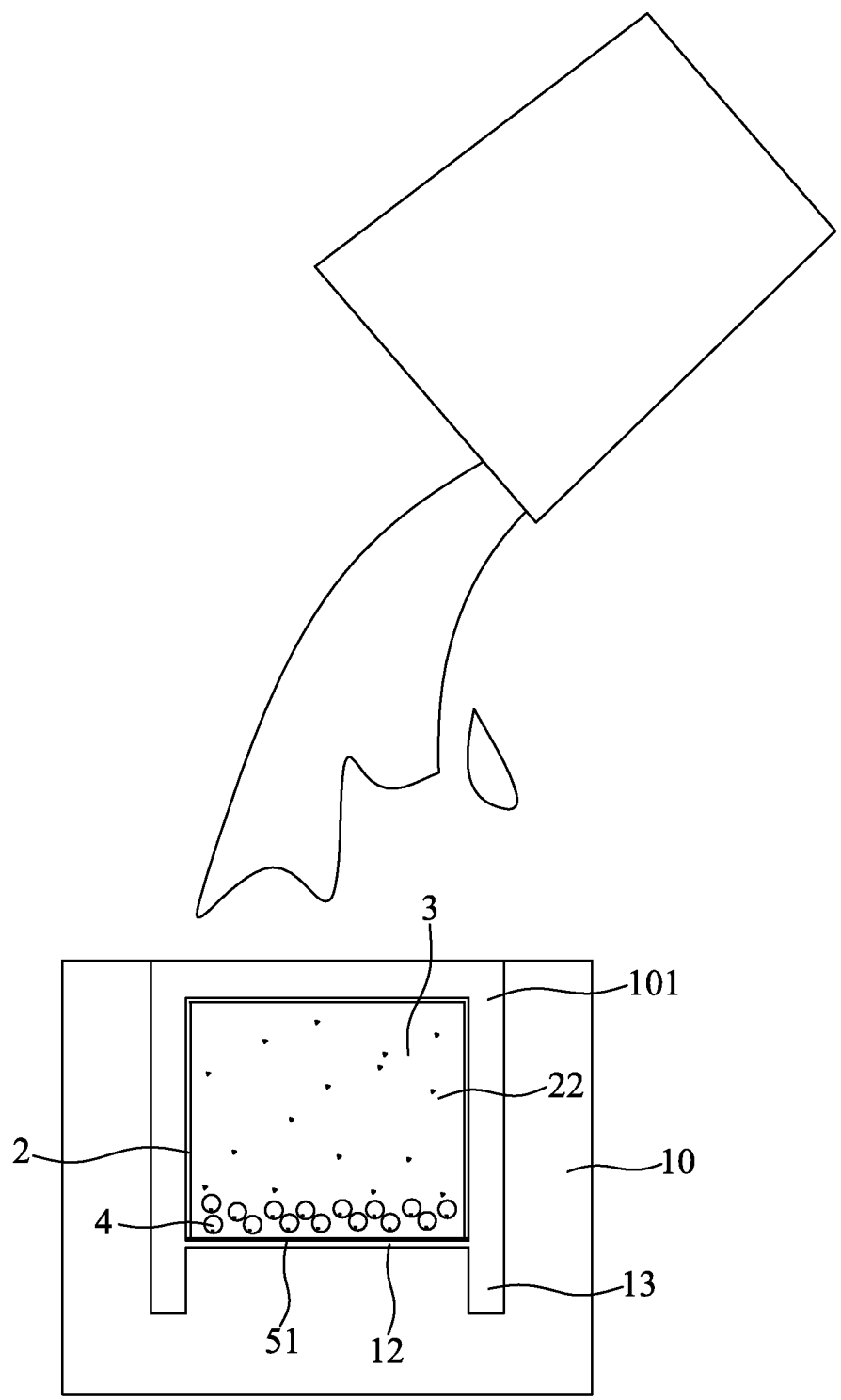

7. As shown in FIG. 2g, pouring slurry into the gap between the side portion of the inner shell 2 and the cavity 101 until the inner shell 2 is covered with the slurry, wherein the slurry after solidified and the seepage layer 12 jointly form an outer shell 1, after the mold is removed, the planting device is completed as shown in FIG. 1.

For planting, the water is poured into the water storage trough 14 and the water is infiltrated into the soil 3, as shown in FIG. 3a. After the plant seeds 4 fully absorb the water, the plant seeds 4 begin to swell and squeeze the internal space up and down. As shown in FIG. 3b, after a few days, most of the plant seeds 4 take root and grow, increasing the pressure on the internal space. When the strength of all seeds germination is greater than the maximum strength that the seepage layer 12 (thin shell) can withstand, the shell breaks and the shoots extend out. As shown in FIG. 3c, the plant seeds 4 continue to grow after germination to form small potted plants, as shown in FIG. 3d.

In the first embodiment, it is only necessary to water the plant to grow out of the closed shell (such as a cement shell, a gypsum shell, or other materials), so that the plants can grow and come out of the cement shell or the gypsum shell. All the soil and the seeds are prefilled in the planting device. It is required to water the seeds only, avoiding hand contact with the soil. The plating device is convenient for use and clean.

FIG. 4 to FIG. 6c illustrates a planting device according to a second embodiment of the present invention. The second embodiment is substantially similar to the first embodiment with the exceptions described hereinafter. The bottom of the second cavity 22 of the inner shell 2 is provided with a water-absorbing expandable layer 6. The soil is filled on the water-absorbing expandable layer 6. The water-absorbing expandable layer 6 is made of a highly hydrophilic resin or compressed fibre-reinforced soil.

FIG. 5a to FIG. 5h illustrates a method for manufacturing a planting device in accordance with the second embodiment of the present invention. The method comprises the steps of:

1. as shown in FIG. 5a, providing an inner shell 2 having a second cavity 22 with an opening 21.

Figure 5B:
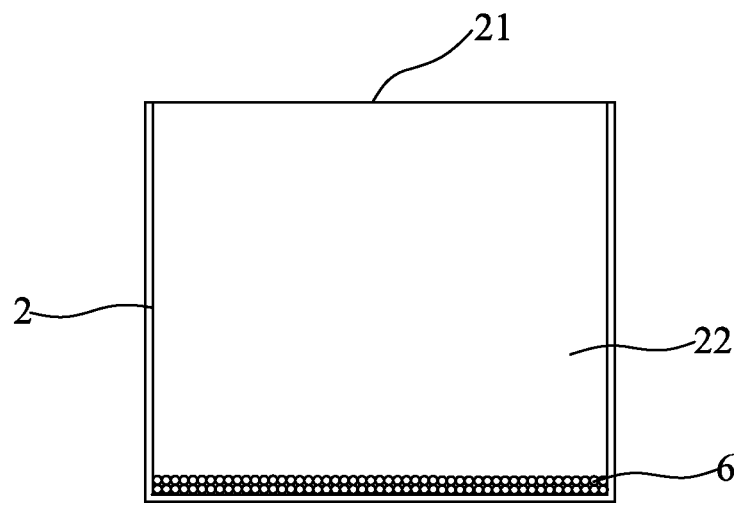

2. as shown in FIG. 5b, providing a water-absorbing expandable layer 6 on the bottom of the second cavity 22 of the inner shell 2.

Figure 5C:
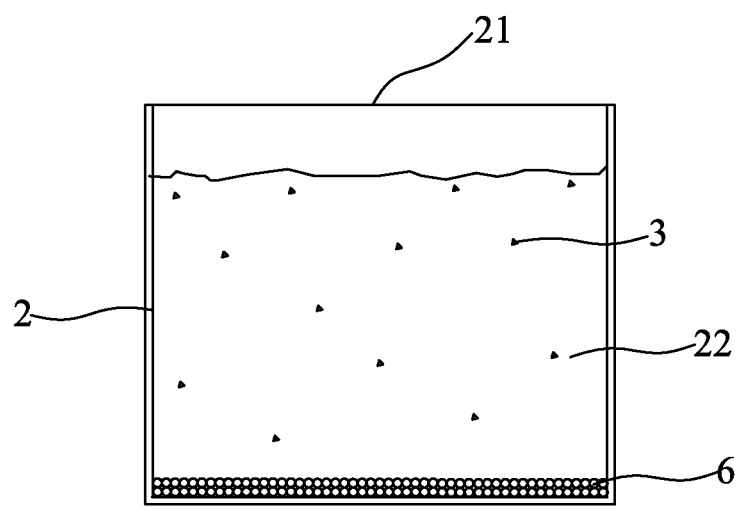

3. as shown in FIG. 5c, filling soil 3 on the water-absorbing expandable layer 6, wherein the soil 3 is dry soil and the space for seeds is reserved.

4. as shown in FIG. 6d, placing plant seeds 4 in the soil 3.

5. as shown in FIG. 5e, sealing the opening 21 of the second cavity 22 of the inner shell 2 with a first water-permeable layer 51.

Figure 5F:
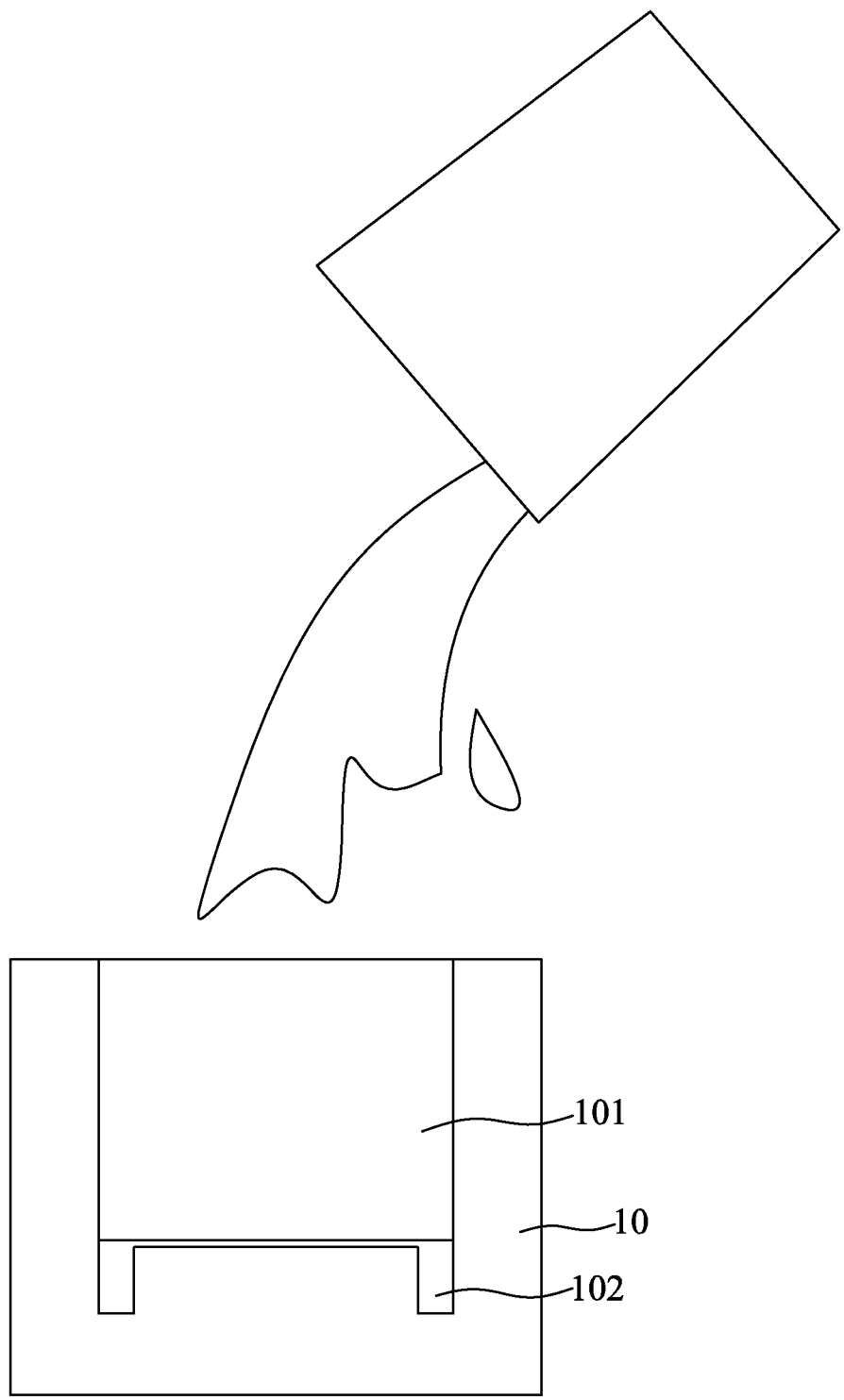

6. as shown in FIG. 5f, providing a mold 10 having a cavity 101, wherein a recess 102 is formed around a bottom of the cavity 101, slurry is poured into the cavity 101 to cover the bottom of the cavity 101 and the recess 102 to form a seepage layer 12 and a retaining wall 13 around an outer side of the seepage layer 12 after the slurry is solidified, and a water storage trough 14 is formed between the retainer wall 13 and the seepage layer 12.

7. as shown in FIG. 5g, placing the inner shell 2 upside down in the cavity 101 of the mold 10, wherein the first water-permeable layer 51 of the inner shell 2 faces the seepage layer 12, a gap is formed between a side portion of the inner shell 2 and the cavity 101, and an upper portion of the inner shell 2 is lower than a mouth portion of the cavity 101.

Figure 5H:
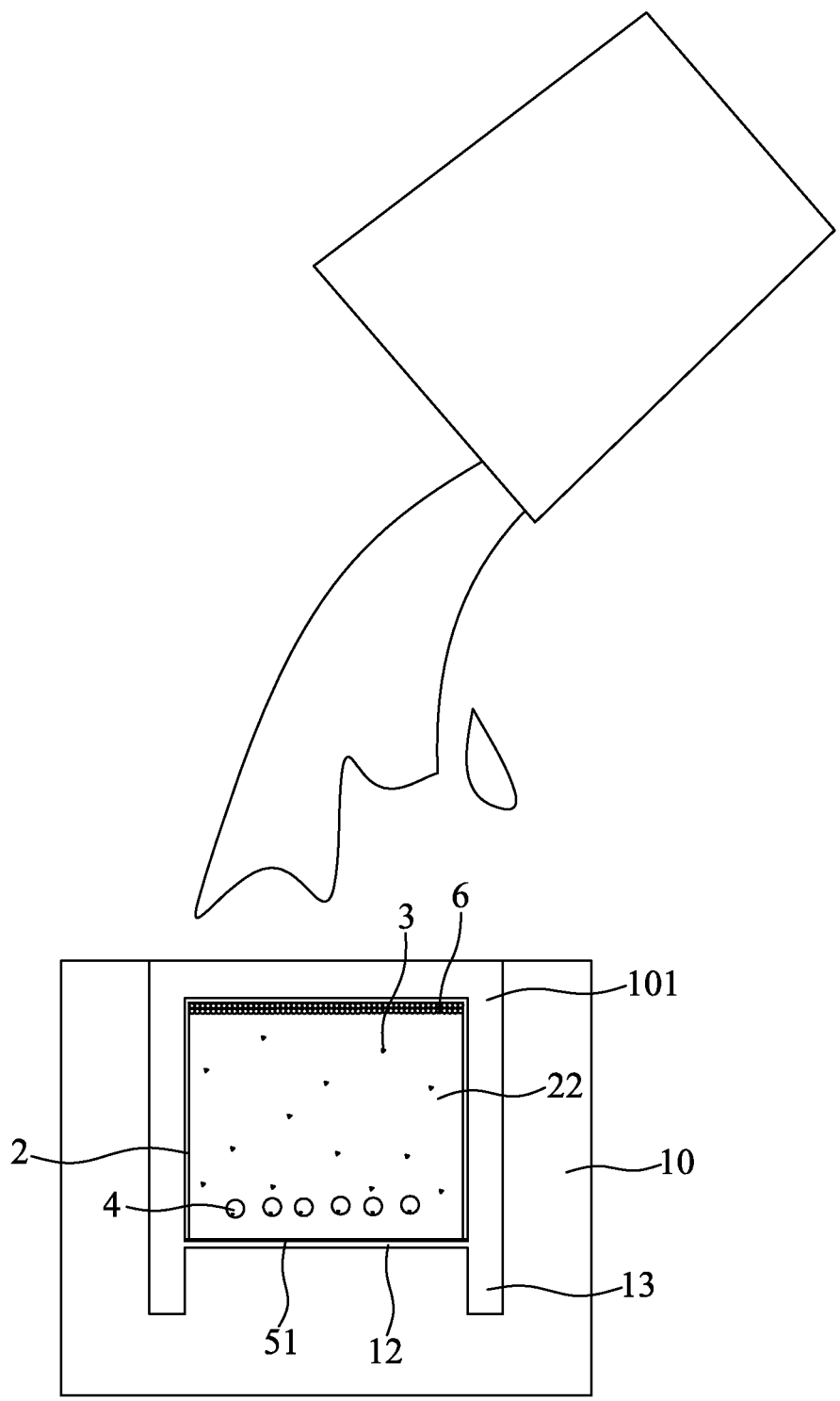

8. as shown in FIG. 5h, pouring slurry into the gap between the side portion of the inner shell 2 and the cavity 101 until the inner shell 2 is covered with the slurry, wherein the slurry after solidified and the seepage layer 12 jointly form an outer shell 1, after the mold is removed, the planting device is completed as shown in FIG. 4.

Figure 6A:
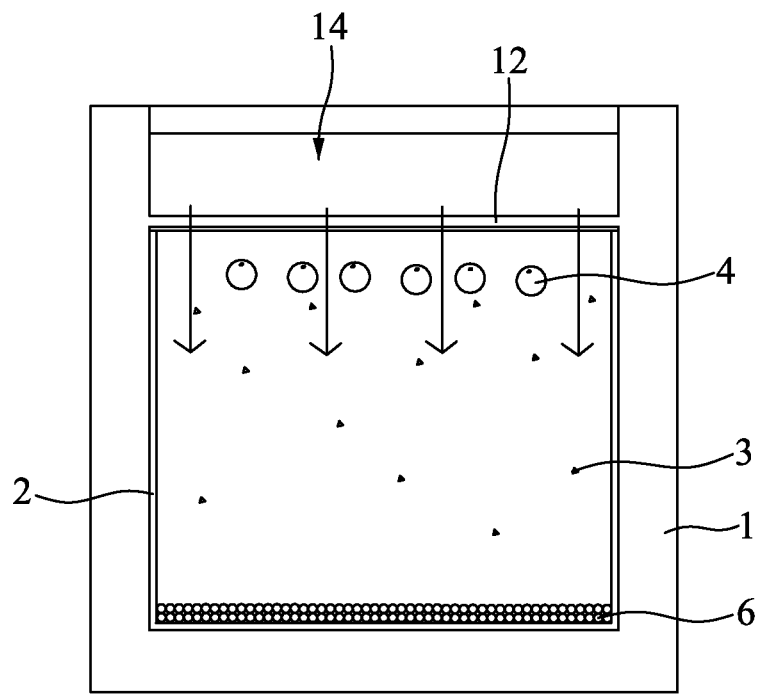
FIGS. 6a to 6c are schematic views of plant planting according to the second embodiment of the present invention.
Figure 6B:
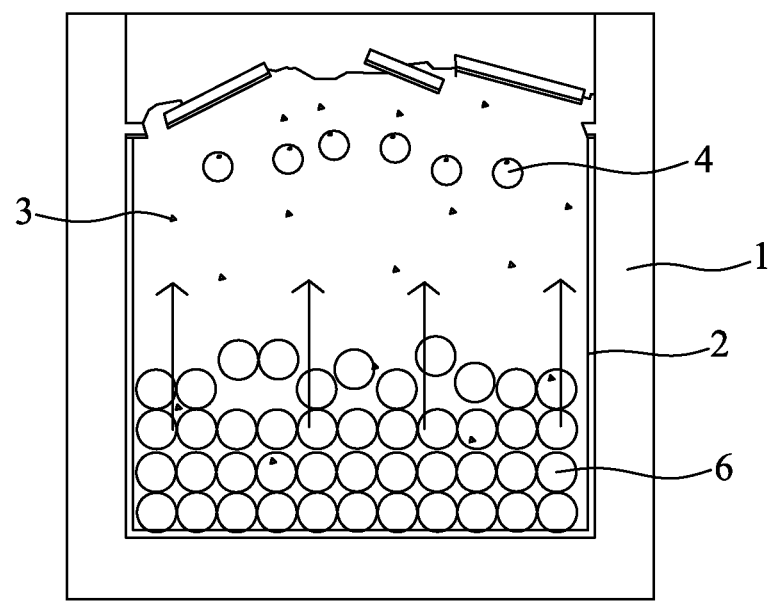
Figure 6C:
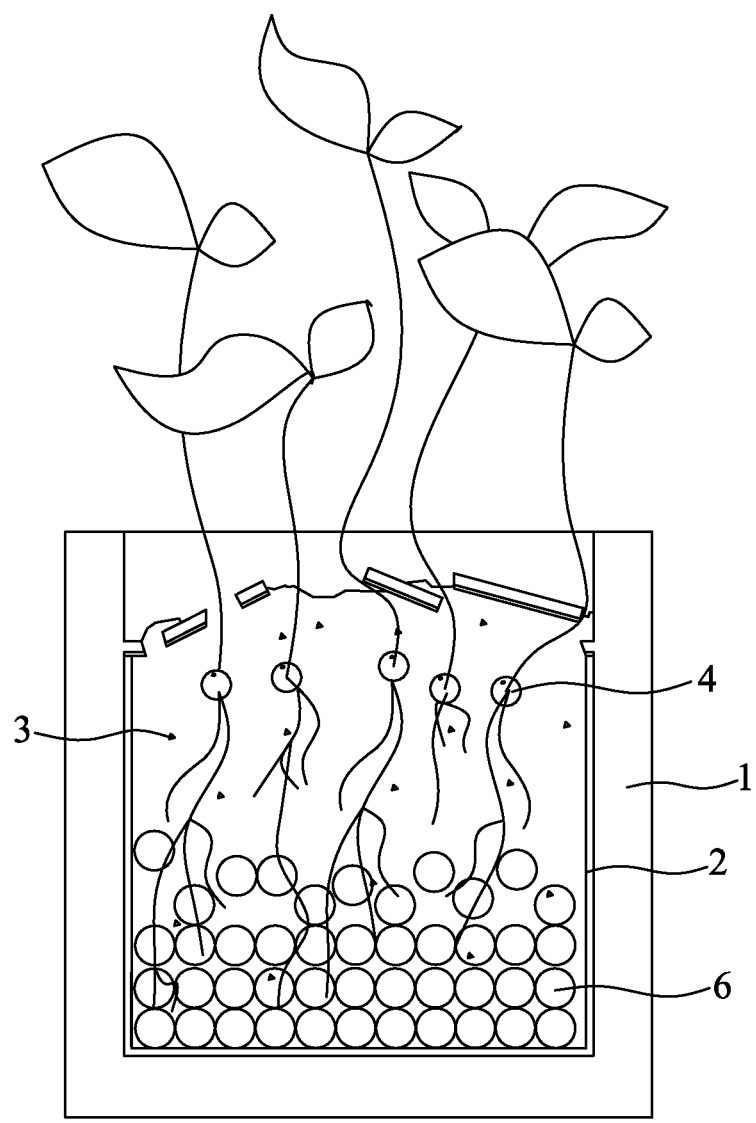

For planting, the water is poured into the water storage trough 14 and the water is infiltrated into the soil 3, as shown in FIG. 6a. After the plant seeds 4 and the water-absorbing expandable layer 6 sufficiently absorb the water, the water-absorbing expandable layer 6 begins to expand until the internal pressure exceeds the critical point that the seepage layer 12 can withstand. The seepage layer 12 breaks and the plant seeds 4 breaks the shell, as shown in FIG. 6b. After a period of time, the plant seeds 4 grow to form small potted plants. The water-absorbing expandable layer 6 (highly hydrophilic resin) is environmentally friendly and biodegradable and has a strong water retention effect, so that it can provide moisture for the soil for a long time, and there is a lot of space between each other for the growth of plant roots to provide a sufficient amount of air, as shown in FIG. 6c.

The second embodiment has the water-absorbing expandable material to absorb water and swell, which helps the seeds break the shell, so that some of the plants having less germinating energy can grow out. This increases the range of options for the plant species, and can greatly reduce the number of seeds used. If a spherical highly hydrophilic resin is used as a water-absorbing expandable material, it can provide moisture for the soil for a long time to reduce the number of watering. The highly hydrophilic resin has a good water retention performance, and its water-absorbing expansion and dehydration contraction make the soil have the gap to provide adequate air so that the plants can grow better.

FIG. 7 to FIG. 10d illustrates a planting device according to a third embodiment of the present invention. The third embodiment is substantially similar to the second embodiment with the exceptions described hereinafter. The planting device further comprises a first shell-breaking structure 7. The first shell-breaking structure 7 is disposed on the water-absorbing expandable layer 6. The first shell-breaking structure 7 points to the seepage layer 12 of the outer shell 1.

As shown in FIG. 8a and FIG. 8b, the first shell-breaking structure 7 is composed of a first tray 71 and a first shell-breaking bar 72. The first tray 71 is placed on the water-absorbing expandable layer 6. The first shell-breaking bar 72 is mounted on the first tray 71. In particular, the first tray 71 is provided with a first sleeve 711, and the first shell-breaking bar 72 is inserted in the first sleeve 711. The first shell-breaking bar 72 points to the seepage layer 12 of the outer shell 1 in order to quickly pierce the seepage layer 12. One end of the first shell-breaking bar 72, facing the seepage layer 12 of the outer shell 1, is a pointed end 721.

FIG. 9a to FIG. 9j illustrates a method for manufacturing a planting device in accordance with the third embodiment of the present invention. The method comprises the steps of:

1. as shown in FIG. 9a, providing an inner shell 2 having a second cavity 22 with an opening 21.

2. as shown in FIG. 9b, providing a water-absorbing expandable layer 6 on the bottom of the second cavity 22 of the inner shell 2.

3. as shown in FIG. 9c, providing a first tray 71 of a first shell-breaking structure 7 on the water-absorbing expandable layer 6.

4. as shown in FIG. 9d, mounting a first shell-breaking bar 72 on the first tray 71.

Figure 9E:
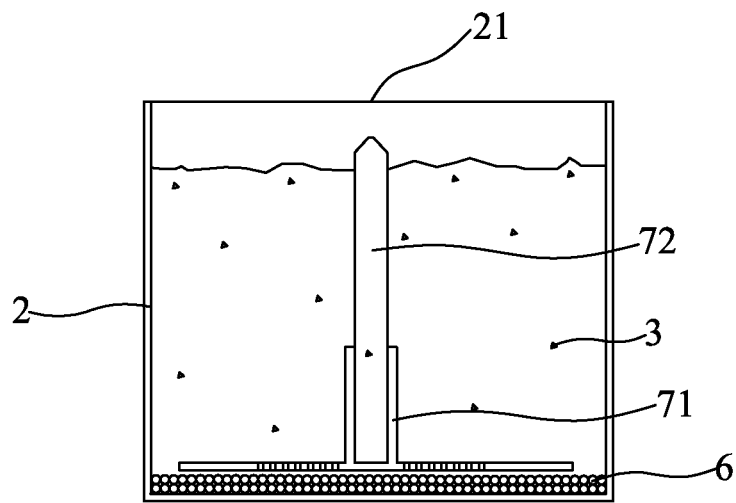

5. as shown in FIG. 9e, filling soil 3 on the first tray 71 of the first shell-breaking structure 7, wherein the soil 3 is dry soil and the space for seeds is reserved.

Figure 9F:
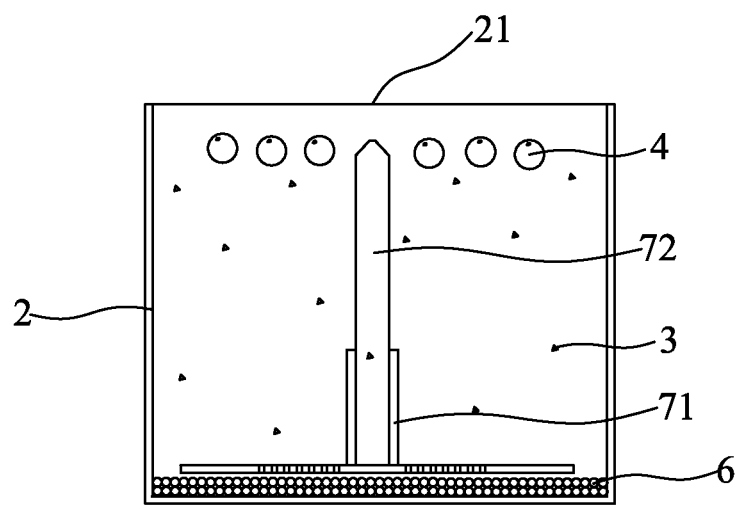

6. as shown in FIG. 9f, placing plant seeds 4 in the soil 3.

Figure 9G:
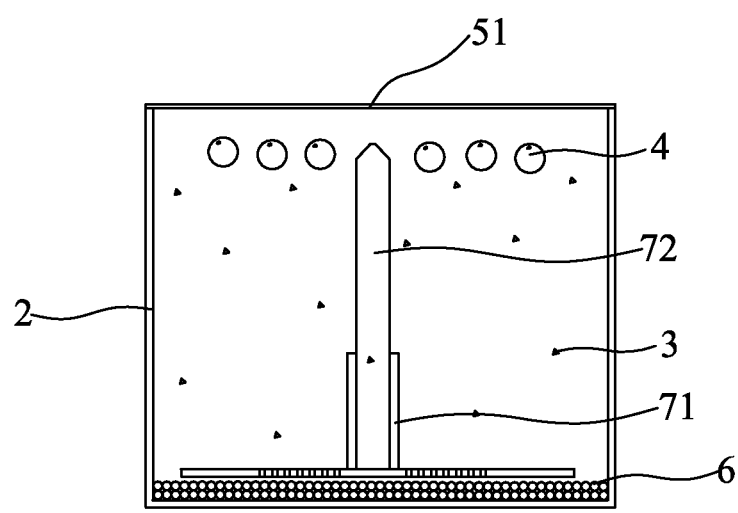

7. as shown in FIG. 9g, sealing the opening 21 of the second cavity 22 of the inner shell 2 with a first water-permeable layer 51.

Figure 9H:
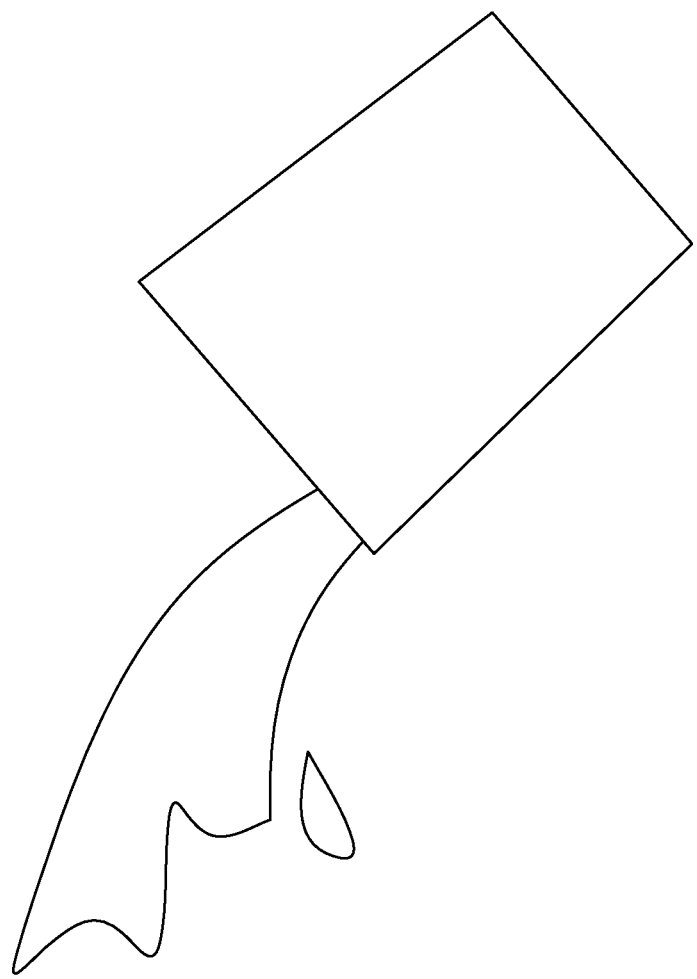
Figure 9H:
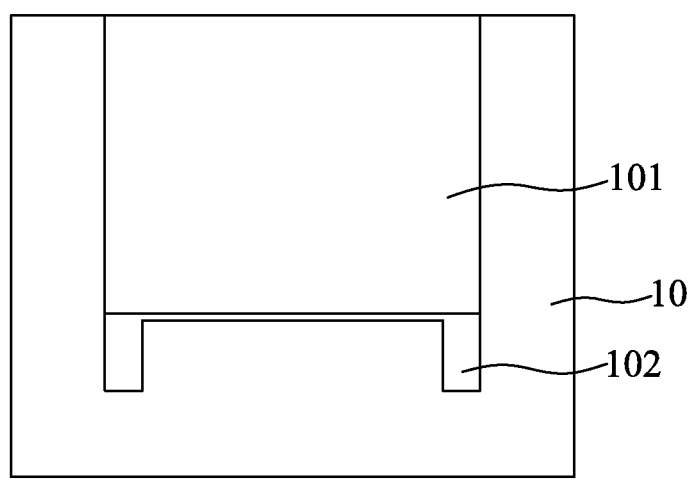

8. as shown in FIG. 9h, providing a mold 10 having a cavity 101, wherein a recess 102 is formed around a bottom of the cavity 101, slurry is poured into the cavity 101 to cover the bottom of the cavity 101 and the recess 102 to form a seepage layer 12 and a retaining wall 13 around an outer side of the seepage layer 12 after the slurry is solidified, and a water storage trough 14 is formed between the retainer wall 13 and the seepage layer 12.

Figure 9I:
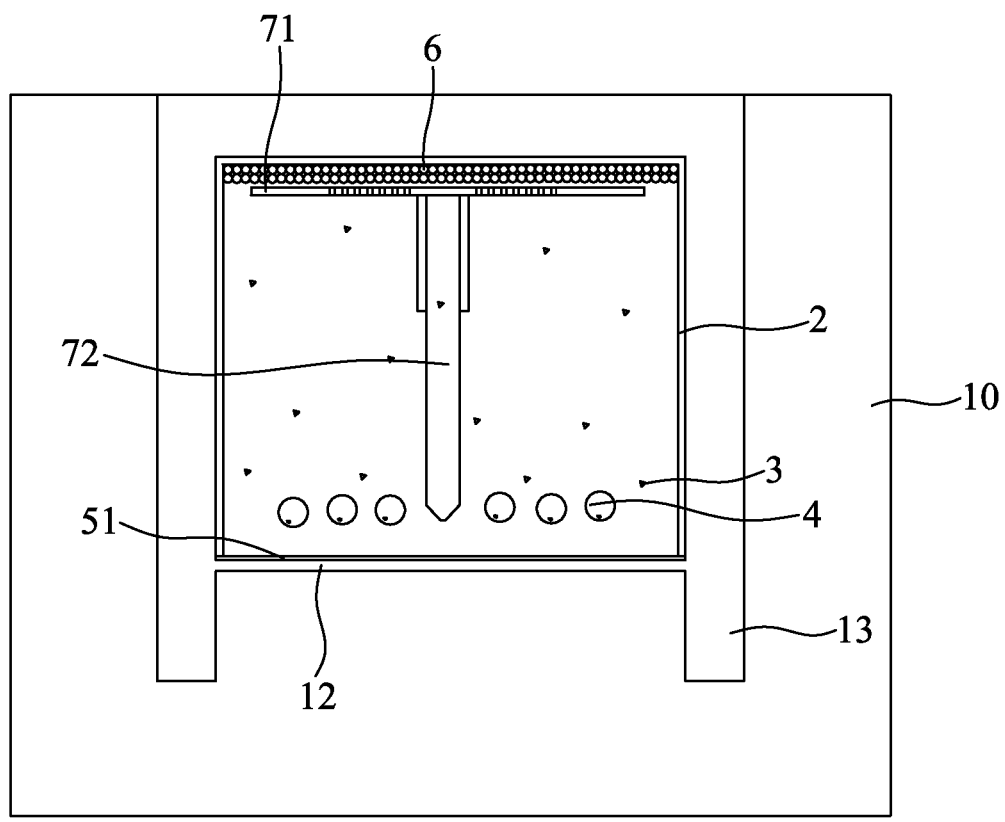

9. as shown in FIG. 9i, placing the inner shell 2 upside down in the cavity 101 of the mold 10, wherein the first water-permeable layer 51 of the inner shell 2 faces the seepage layer 12, a gap is formed between a side portion of the inner shell 2 and the cavity 101, and an upper portion of the inner shell 2 is lower than a mouth portion of the cavity 101.

Figure 9J:
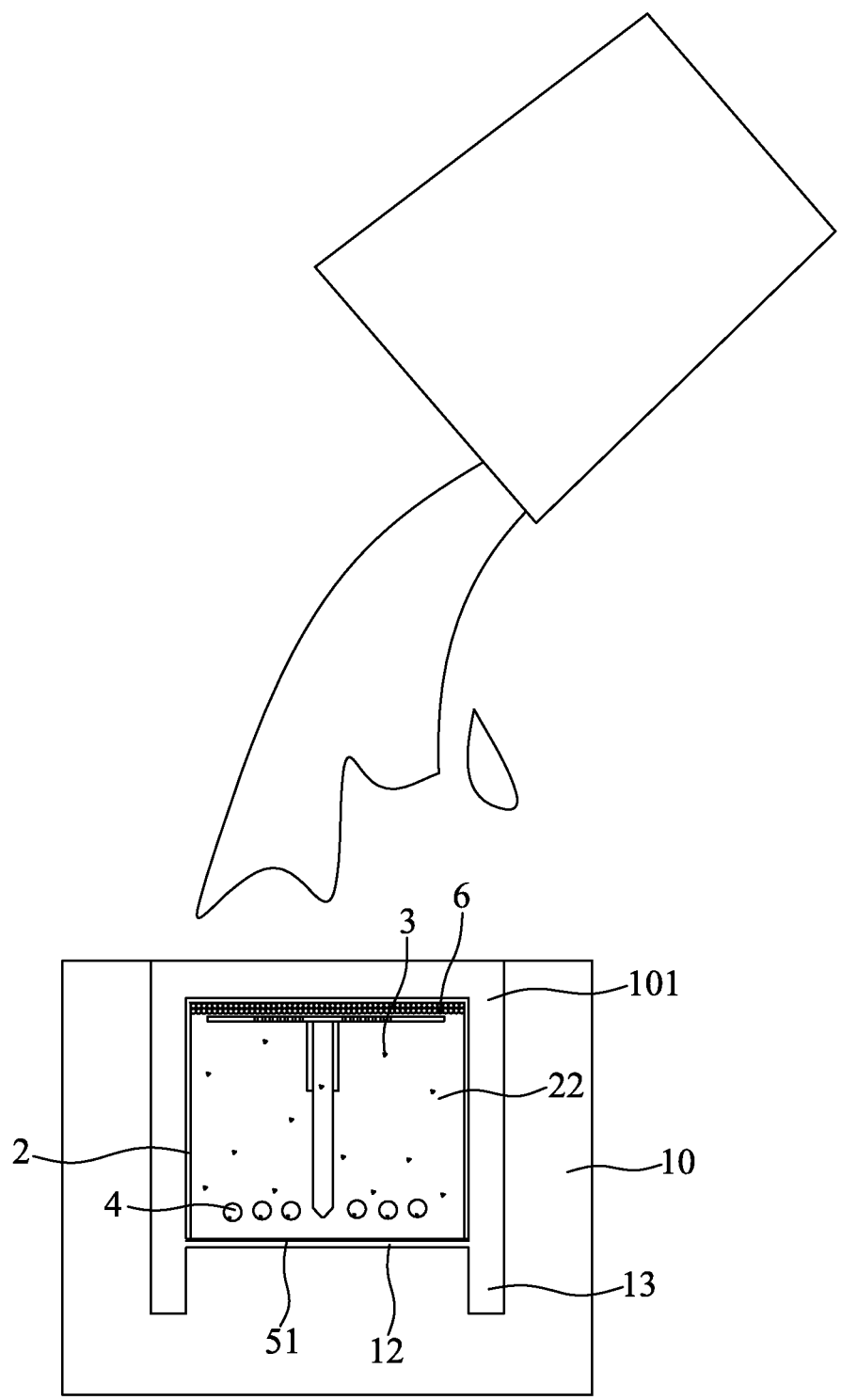

10. as shown in FIG. 9j, pouring slurry into the gap between the side portion of the inner shell 2 and the cavity 101 until the inner shell 2 is covered with the slurry, wherein the slurry after solidified and the seepage layer 12 jointly form an outer shell 1, after the mold is removed, the planting device is completed as shown in FIG. 7.

Figure 10C:
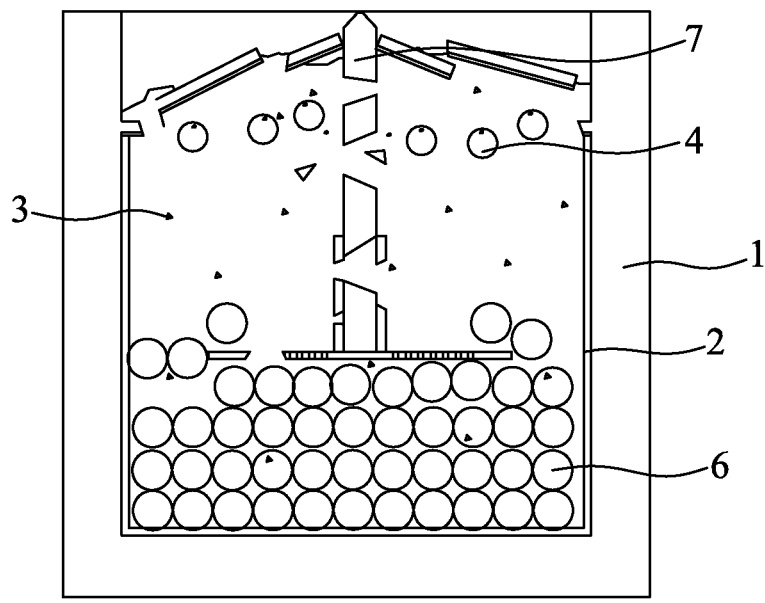

For planting, the water is poured into the water storage trough 14 and the water is infiltrated into the soil 3, as shown in FIG. 10a. After the water-absorbing expandable material (the water-absorbing expandable layer 6) sufficiently absorbs the water, it begins to expand to push the first shell-breaking structure 7 upward. The first tray 71 withstands most of the force from below, and the force is concentrated to the small area of the top of the first shell-breaking bar 72, creating a great pressure on the seepage layer 12. When it exceeds the critical point that the seepage layer 12 can withstand, the seepage layer 12 will break, as shown in FIG. 10b. After a period of time, the first shell-breaking structure 7 is slowly decomposed under erosion by water, as shown in FIG. 10c. After a period of time, the plants grow to form small potted plants. The water-absorbing expandable layer 6 (highly hydrophilic resin) is environmentally friendly and biodegradable and has a strong water retention effect, so that it can provide moisture for the soil for a long time, and there is a lot of space between each other for the growth of plant roots to provide a sufficient amount of air, as shown in FIG. 10d.

The third embodiment is provided with the first shell-breaking structure 7 to break the shell. The possibility of success for breaking the shell is very high, so that the planting device is not subject to the species and the number of seeds.

FIG. 11 to FIG. 14e illustrates a planting device according to a fourth embodiment of the present invention. The fourth embodiment is substantially similar to the third embodiment with the exceptions described hereinafter. The planting device further comprises a second shell-breaking structure 8 and a bracket 81. The second shell-breaking structure 8 is mounted on the bracket 81. One side of the second shell-breaking structure 8 points to the bottom of the first cavity 11 of the outer shell 1 and the bottom of the second cavity 22 of the inner shell 2. Another side of the second shell-breaking structure 8 is provided with a water-absorbing expandable layer 6. The bracket 81 is disposed at the bottom of the second cavity 22 of the inner shell 2.

Figure 12:
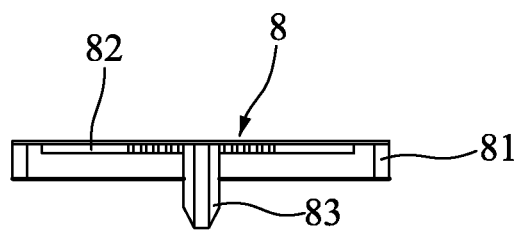
FIG. 12 is a schematic view of the second shell-breaking structure in accordance with the fourth embodiment of the present invention.

As shown in FIG. 12, the second shell-breaking structure 8 is composed of a second tray 82, a second shell-breaking bar 83 and a paper holder 84. The second shell-breaking bar 83 is disposed on one side of the second tray 82. In this embodiment, the second tray 82 is integrally formed with the second shell-breaking bar 83. Another side of the second tray 82 is fixed to the paper holder 84. The second shell-breaking bar 83 points to the bottom of the first cavity 11 of the outer shell 1 and the bottom of the second cavity 22 of the inner shell 2. The paper holder 84 is secured on the bracket 81. The water-absorbing expandable layer 6 is placed on the paper holder 84.

The function of the paper holder 84 is to hold the second tray 82 in the absence of water. The paper holder 84 is broken under the extrusion of the expandable structure. The entire second tray 82 faces down. If there is no paper holder 84, the second tray 82 is directly disposed on the bracket 81. Since the second tray 82 is rigid and hard, it is firmly seated on the bracket 81 and cannot move downward.

The bottom of the second cavity 22 of the inner shell 2 protrudes downward and is provided with a drain mouth 23. The drain mouth 23 is sealed with a second water-permeable layer 52. The bottom of the first cavity 11 of the outer shell 1 is provided with a recess 15. The drain mouth 23 of the inner shell 2 is located in the recess 15 of the outer shell 1. The second shell-breaking bar 53 is located in the drain mouth 23 of the inner shell 2. The planting device further comprises a water storage tray 9. The water storage tray 9 is mounted to a lower portion of the outer shell 1, facing the second shell-breaking structure 8. The second-permeable layer 52 may be a piece of paper having good water permeability and being water-soluble.

One end of the second shell-breaking bar 83, pointing to the bottom of the first cavity 11 of the outer shell 1 and the bottom of the second cavity 22 of the inner shell 2, is a pointed end.

Figure 13A:
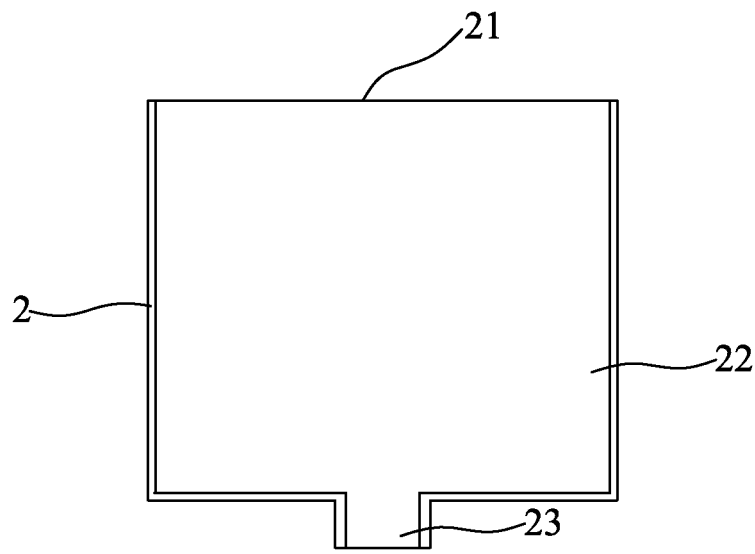

FIG. 13a to FIG. 13m illustrates a method for manufacturing a planting device in accordance with the fourth embodiment of the present invention. The method comprises the steps of:

1. as shown in FIG. 13a, providing an inner shell 2 having a second cavity 22 with an opening 21, wherein the bottom of the second cavity 22 of the inner shell 2 protrudes downward and is provided with a drain mouth 23.

Figure 13B:
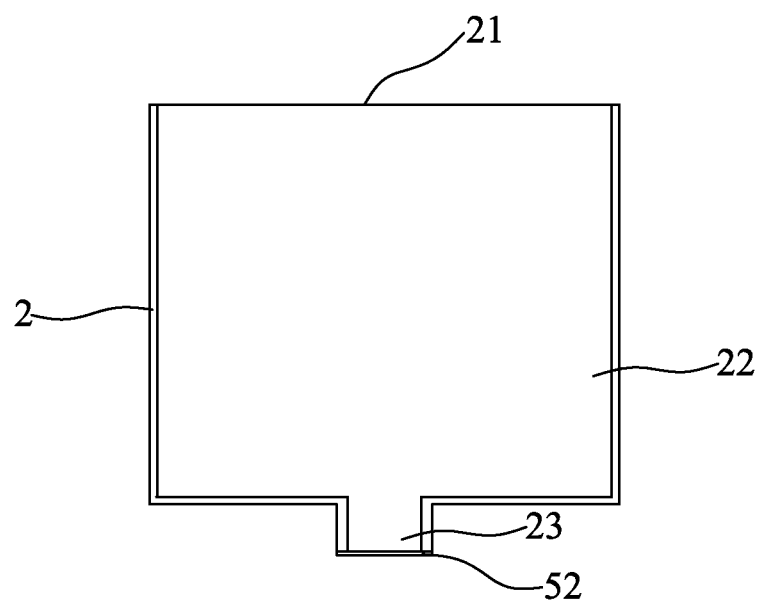

2. as shown in FIG. 13b, sealing the drain mouth 23 with a second water-permeable layer 52.

3. as shown in FIG. 13c, providing a bracket 81 at the bottom of the second cavity 22 of the inner shell 2.

4. as shown in FIG. 13d, mounting a second shell-breaking structure 8 on the bracket 81, wherein the second shell-breaking structure 8 is composed of a second tray 82, a second shell-breaking bar 83 and a paper holder 84; the second shell-breaking bar 83 is disposed on one side of the second tray 82; another side of the second tray 82 is fixed to the paper holder 84; the second shell-breaking bar 83 points to the bottom of the first cavity 11 of the outer shell 1 and the bottom of the second cavity 22 of the inner shell 2; and the paper holder 84 is secured on the bracket 81. The paper holder 84 is a layer of paper having a higher strength but water-soluble for holding the second tray 82 of the second shell-breaking structure 8.

5. as shown in FIG. 13e, providing a water-absorbing expandable layer 6 on the paper holder 84 of the second shell-breaking structure 8.

6. as shown in FIG. 13f, providing a first tray 71 of a first shell-breaking structure 7 on the water-absorbing expandable layer 6.

7. as shown in FIG. 13g, mounting a first shell-breaking bar 72 on the first tray 71.

8. as shown in FIG. 13h, filling soil 3 on the first tray 71 of the first shell-breaking structure 7, wherein the soil 3 is dry soil and the space for seeds is reserved.

Figure 13I:
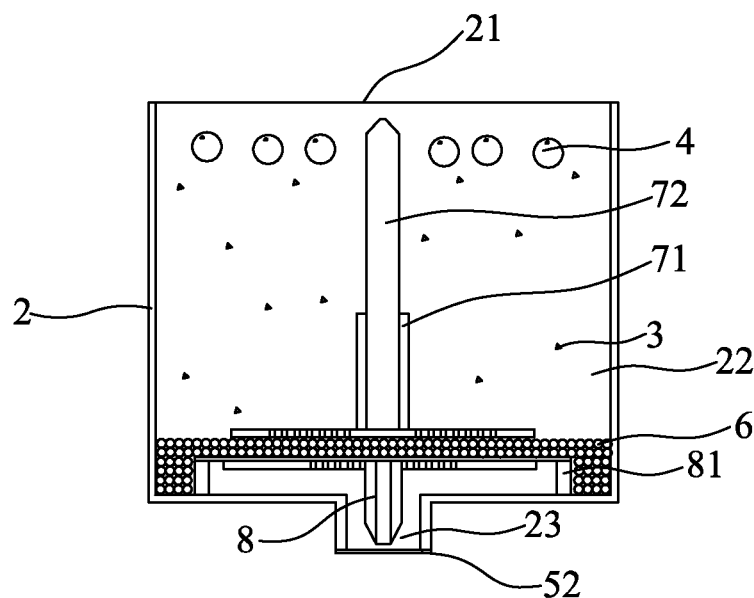

9. as shown in FIG. 13i, placing plant seeds 4 in the soil 3.

Figure 13J:
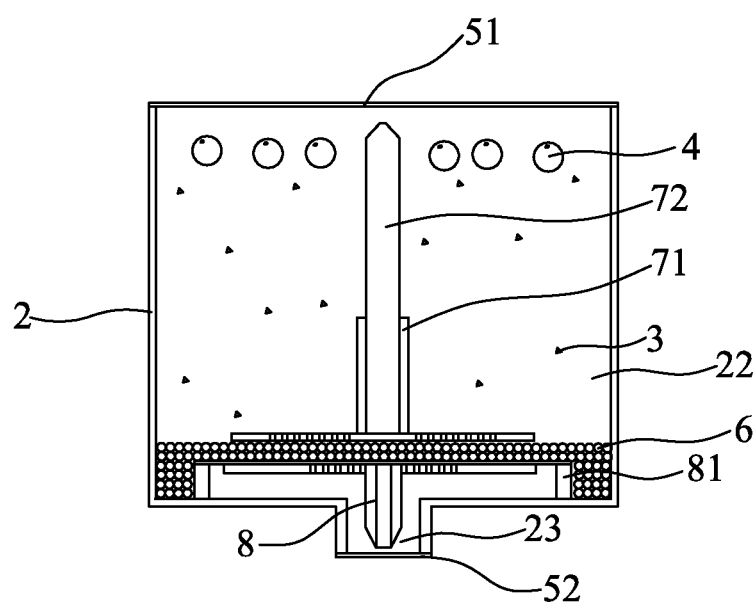

10. as shown in FIG. 13j, sealing the opening 21 of the second cavity 22 of the inner shell 2 with a first water-permeable layer 51.

Figure 13K:
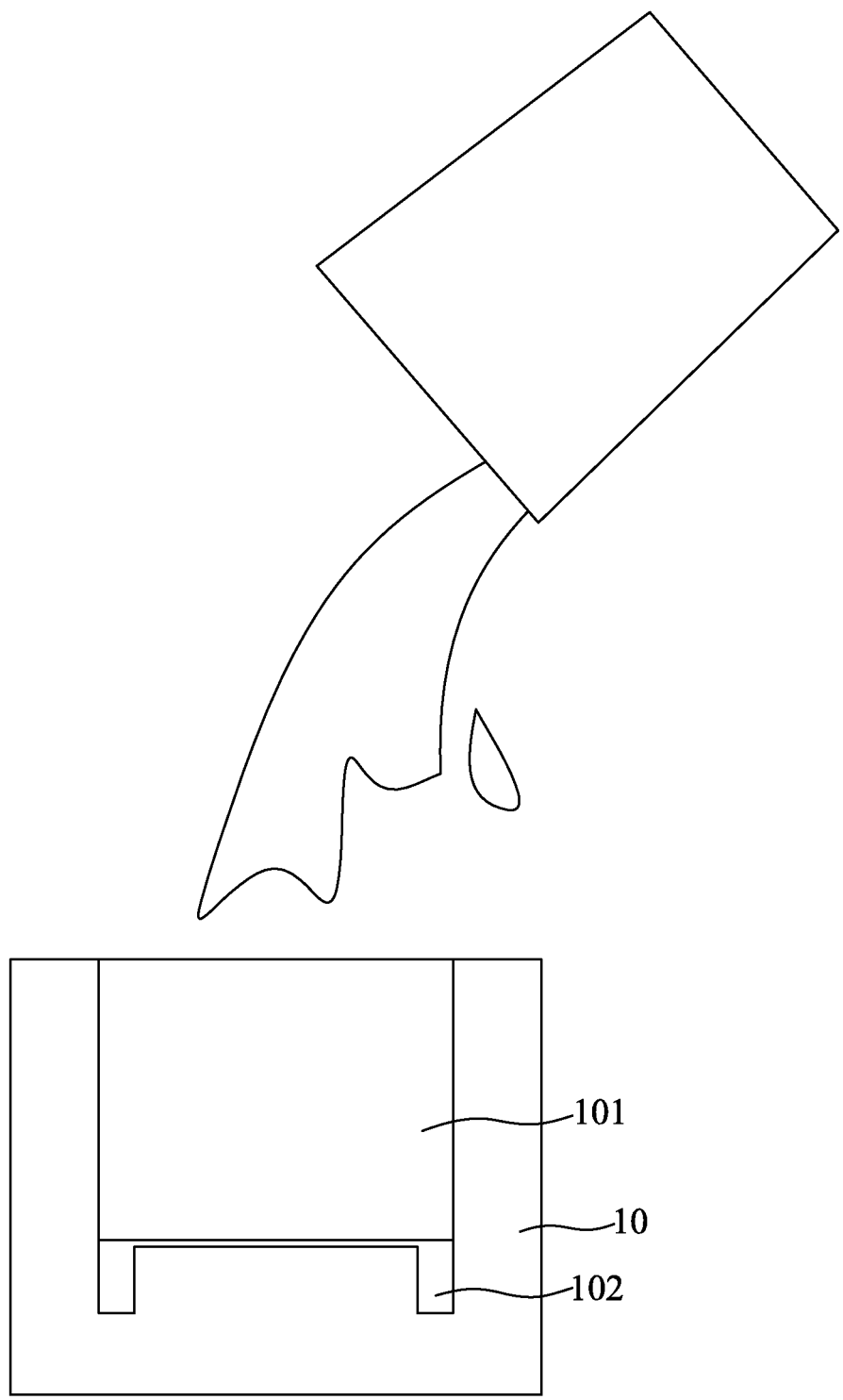

11. as shown in FIG. 13k, providing a mold 10 having a cavity 101, wherein a recess 102 is formed around a bottom of the cavity 101, slurry is poured into the cavity 101 to cover the bottom of the cavity 101 and the recess 102 to form a seepage layer 12 and a retaining wall 13 around an outer side of the seepage layer 12 after the slurry is solidified, and a water storage trough 14 is formed between the retainer wall 13 and the seepage layer 12.

12. as shown in FIG. 13l, placing the inner shell 2 upside down in the cavity 101 of the mold 10, wherein the first water-permeable layer 51 of the inner shell 2 faces the seepage layer 12, a gap is formed between a side portion of the inner shell 2 and the cavity 101, and an upper portion of the inner shell 2 is lower than a mouth portion of the cavity 101.

Figure 11:
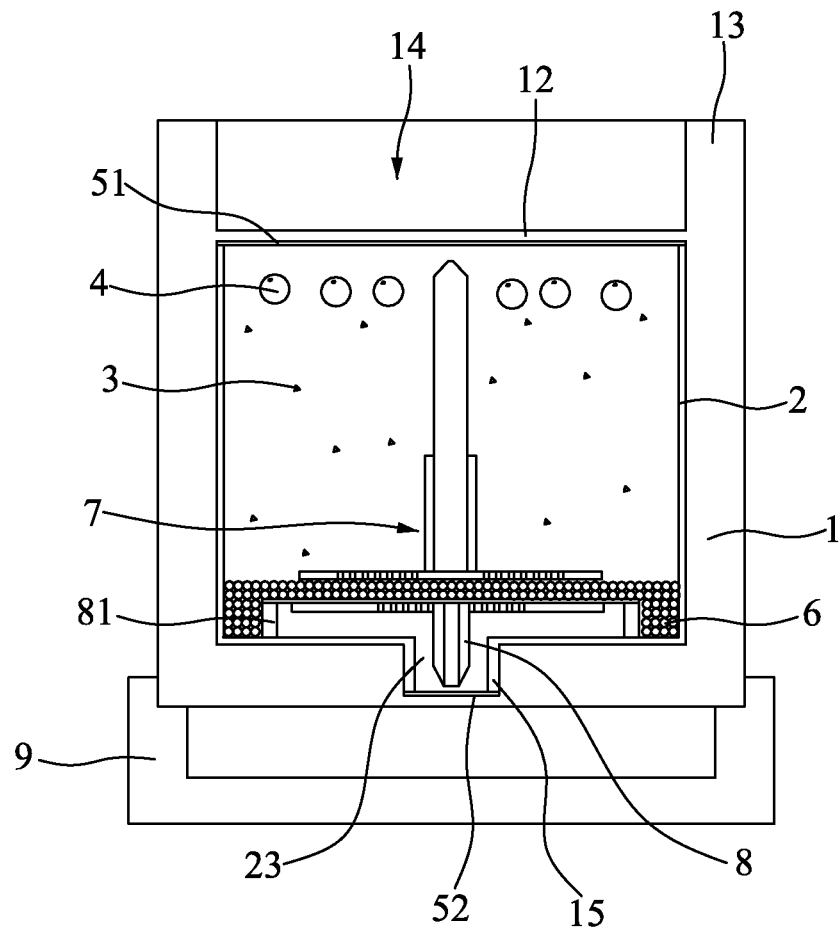
FIG. 11 is a structural schematic view in accordance with a fourth embodiment of the present invention.
Figure 13M:
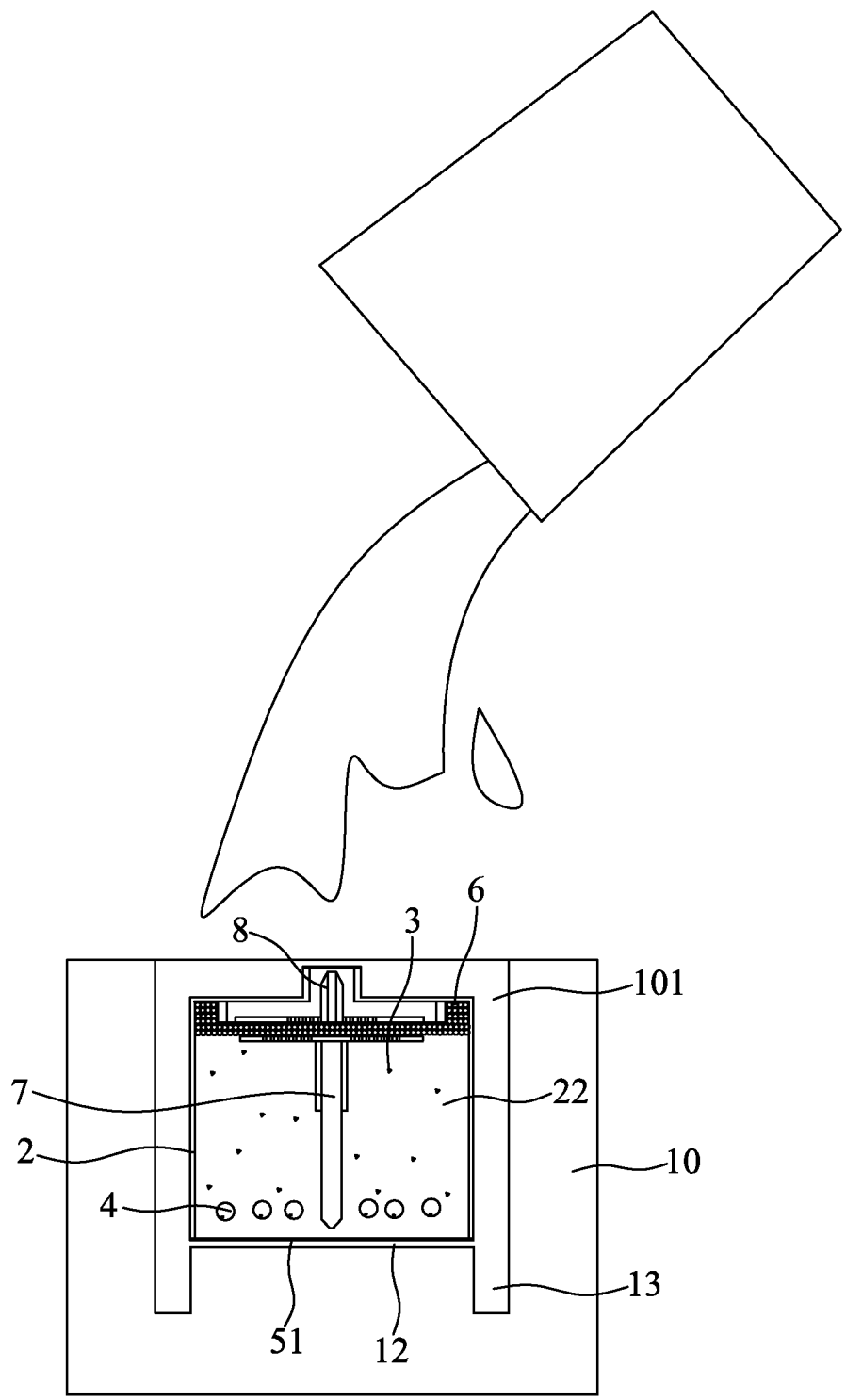

13. as shown in FIG. 13m, pouring slurry into the gap between the side portion of the inner shell 2 and the cavity 101 until the inner shell 2 is covered with the slurry, wherein the slurry after solidified and the seepage layer 12 jointly form an outer shell 1, after the mold is removed, the planting device is completed as shown in FIG. 11.

Figure 14A:
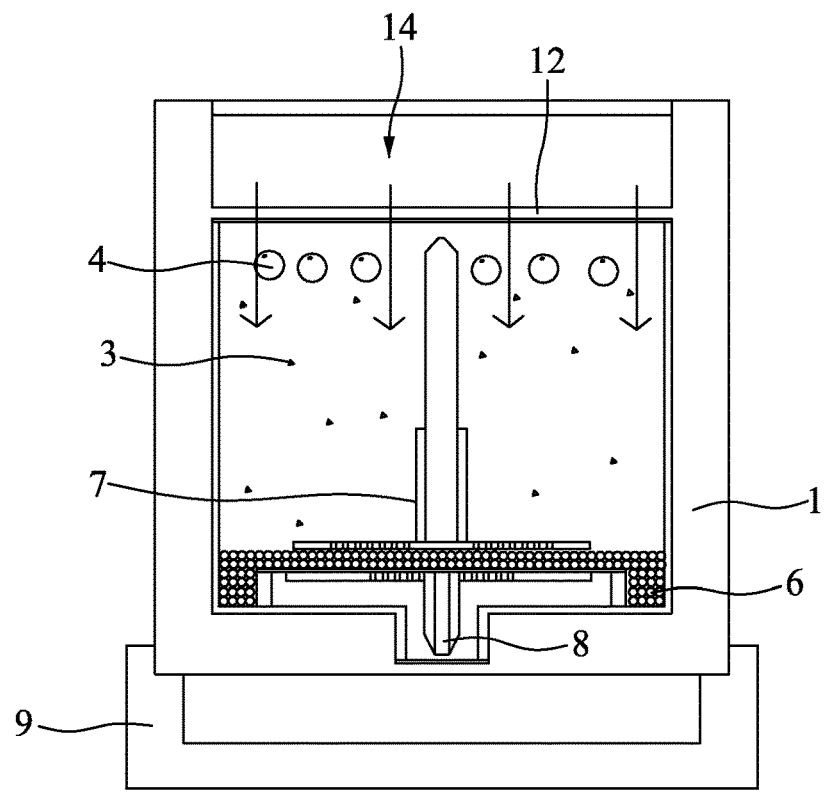
Figure 14B:
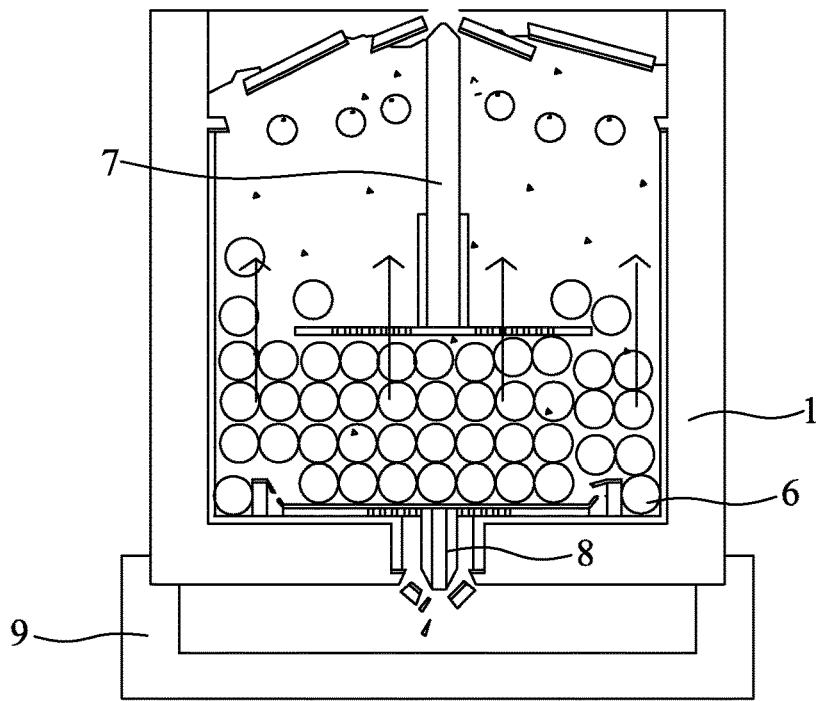
Figure 14E:
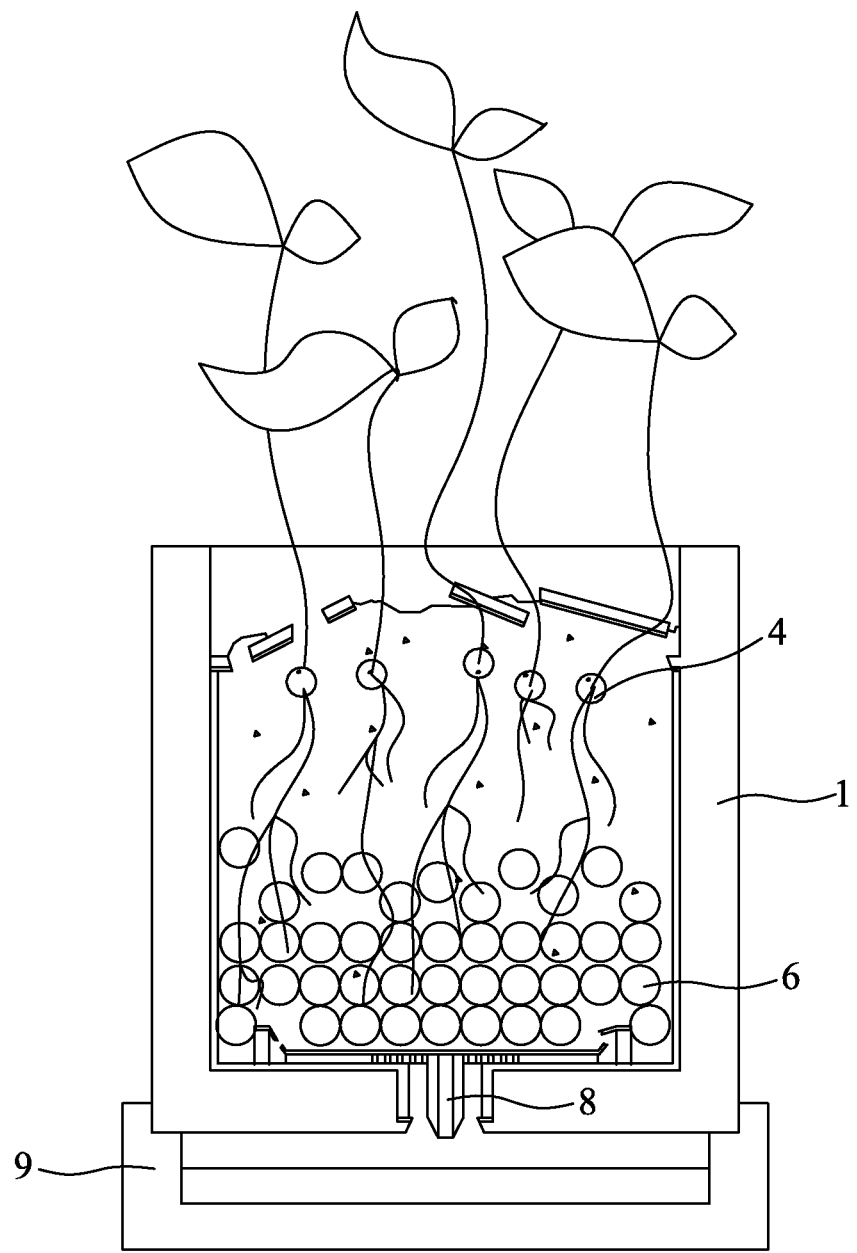

For planting, the water is poured into the water storage trough 14 and the water is infiltrated into the soil 3, as shown in FIG. 14a. After the water-absorbing expandable material (the water-absorbing expandable layer 6) sufficiently absorbs the water, it begins to expand to push the first shell-breaking structure 7 upward and to push the second shell-breaking structure 8 downward simultaneously. The strength of the paper holder of the second shell-breaking structure 8 sharp decreases when meeting the water, so it is first broken. The first shell-breaking structure 7 continues to move upward to apply pressure, and the second shell-breaking structure 8 continues to move downward to apply pressure. The first shell-breaking structure 7 pierces the seepage layer 12, and the second shell-breaking structure 8 pierces the bottom of the recess 15 of the outer shell 1, as shown in FIG. 14b. After breaking the shell, the first shell-breaking bar 72 can be directly removed from the shell or slowly decomposed, as shown in FIG. 14c. After a period of time, the first tray 71 begins to decompose, as shown in FIG. 14d. After a period of time, the plants grow to form small potted plants. The water-absorbing expandable layer 6 (highly hydrophilic resin) is environmentally friendly and biodegradable and has a strong water retention effect, so that it can provide moisture for the soil for a long time, and there is a lot of space between each other for the growth of plant roots to provide a sufficient amount of air, as shown in FIG. 14e.

The fourth embodiment is provided with two auxiliary shell-breaking structures 7 to break the shell. The possibility of success for breaking the shell is very high, so that the planting device is not subject to the species and the number of seeds. Besides, the planting device can be formed with a drain hole, so that the planting device can be used for seeds that need more strict requirements for drainage.

Figure 15:
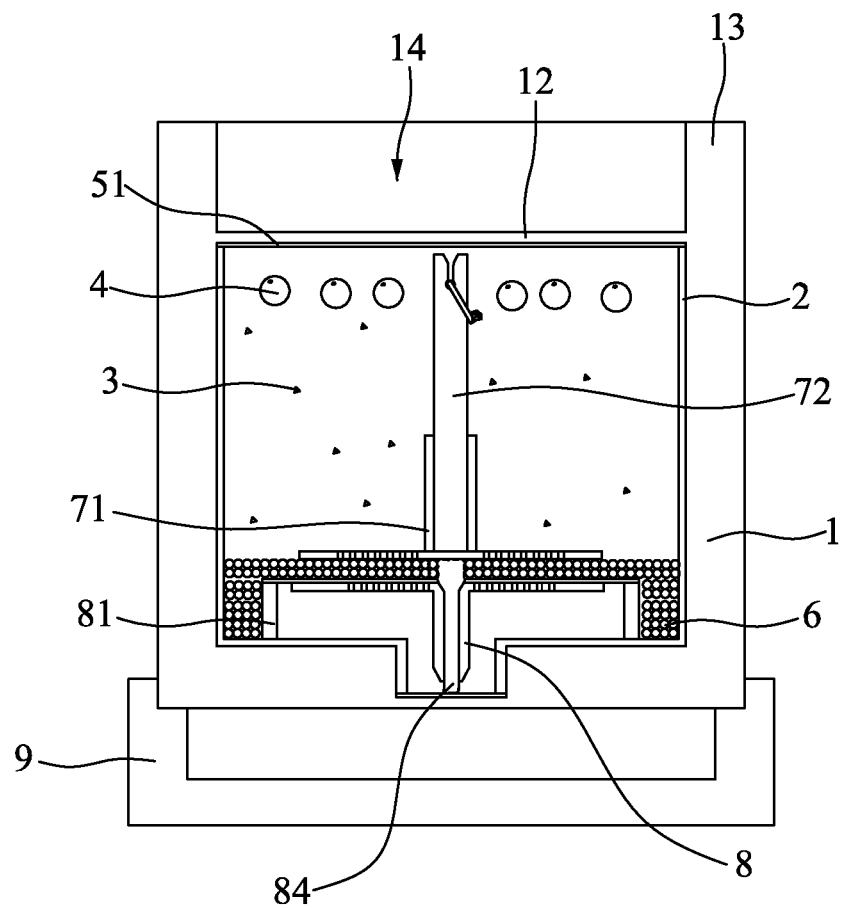
FIG. 15 is a structural schematic view in accordance with a fifth embodiment of the present invention.
Figure 16:
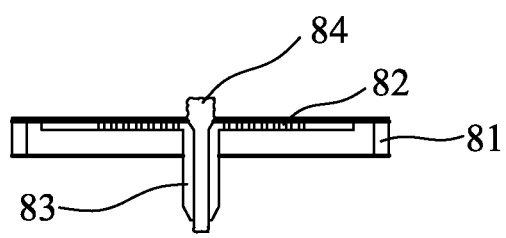
FIG. 16 is a schematic view of the second shell-breaking structure in accordance with the fifth embodiment of the present invention.

FIG. 15 to FIG. 18e illustrates a planting device according to a fifth embodiment of the present invention. The fifth embodiment is substantially similar to the fourth embodiment with the exceptions described hereinafter. The second shell-breaking bar 83 has a hollow passage therein. A fiber bar 85 is inserted in the hollow passage, as shown in FIG. 15 and FIG. 16. One end of the first shell-breaking bar 72, pointing to the seepage layer 12 of the outer shell 1, is provided with a pendant 722. The pendant 722 may be a ring.

FIG. 17a to FIG. 17m illustrates a method for manufacturing a planting device in accordance with the fifth embodiment of the present invention. The method comprises the steps of:

1. as shown in FIG. 17a, providing an inner shell 2 having a second cavity 22 with an opening 21, wherein the bottom of the second cavity 22 of the inner shell 2 protrudes downward and is provided with a drain mouth 23.

2. as shown in FIG. 17b, sealing the drain mouth 23 with a second water-permeable layer 52.

Figure 17C:
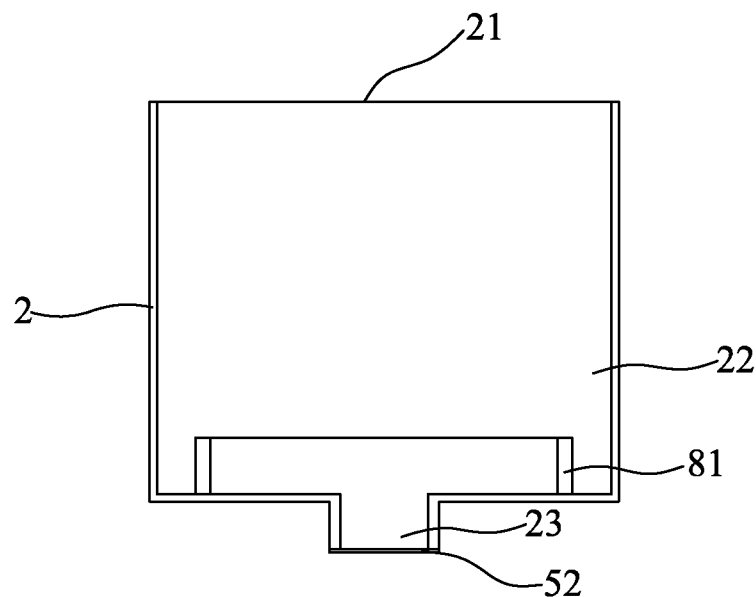

3. as shown in FIG. 17c, providing a bracket 81 at the bottom of the second cavity 22 of the inner shell 2.

Figure 17D:
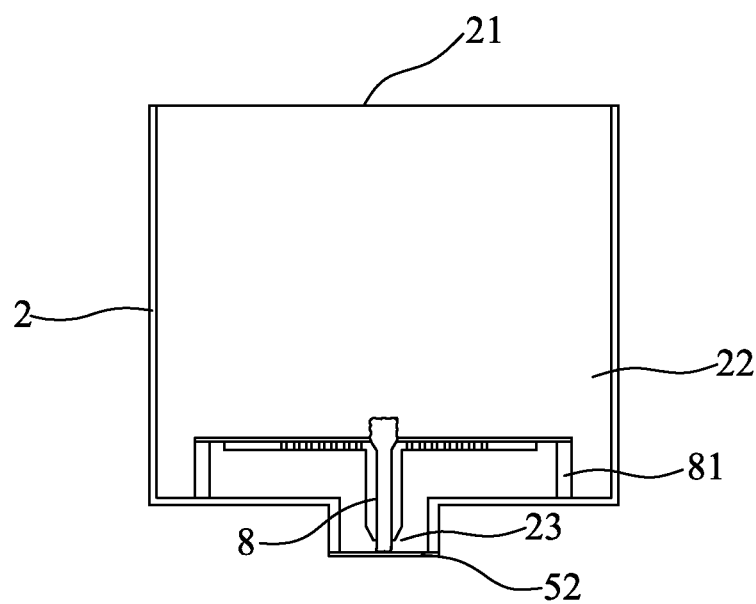

4. as shown in FIG. 17d, mounting a second shell-breaking structure 8 on the bracket 81, wherein the second shell-breaking structure 8 is composed of a second tray 82, a second shell-breaking bar 83 and a paper holder 84; the second shell-breaking bar 83 is disposed on one side of the second tray 82; another side of the second tray 82 is fixed to the paper holder 84; the second shell-breaking bar 83 points to the bottom of the second cavity 22 of the inner shell 2 and is located in the drain mouth 23; the paper holder 84 is secured on the bracket 81; the second shell-breaking bar 83 has a hollow passage therein; and a fiber bar 85 is inserted in the hollow passage.

Figure 17E:
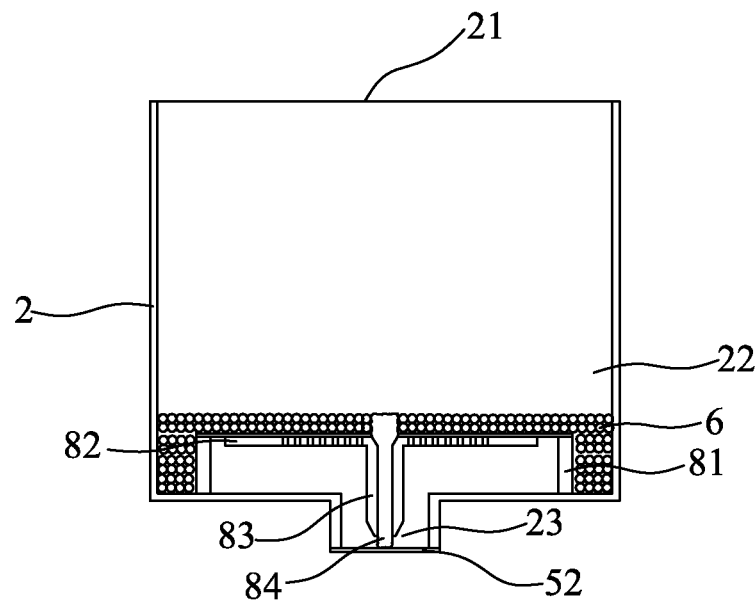

5. as shown in FIG. 17e, providing a water-absorbing expandable layer 6 on the paper holder 84 of the second shell-breaking structure 8.

Figure 17F:
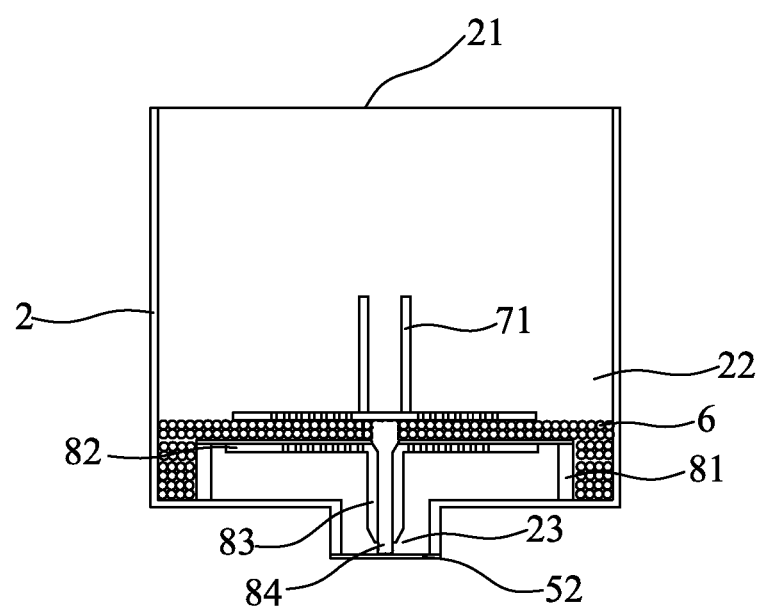

6. as shown in FIG. 17f, providing a first tray 71 of a first shell-breaking structure 7 on the water-absorbing expandable layer 6.

7. as shown in FIG. 17g, mounting a first shell-breaking bar 72 on the first tray 71, wherein the first shell-breaking bar 72 points to the seepage layer 12 of the outer shell 1, and one end of the first shell-breaking bar 72, pointing to the seepage layer 12 of the outer shell 1, is provided with a pendant 722.

8. as shown in FIG. 17h, filling soil 3 on the first tray 71 of the first shell-breaking structure 7, wherein the soil 3 is dry soil and the space for seeds is reserved.

Figure 17I:
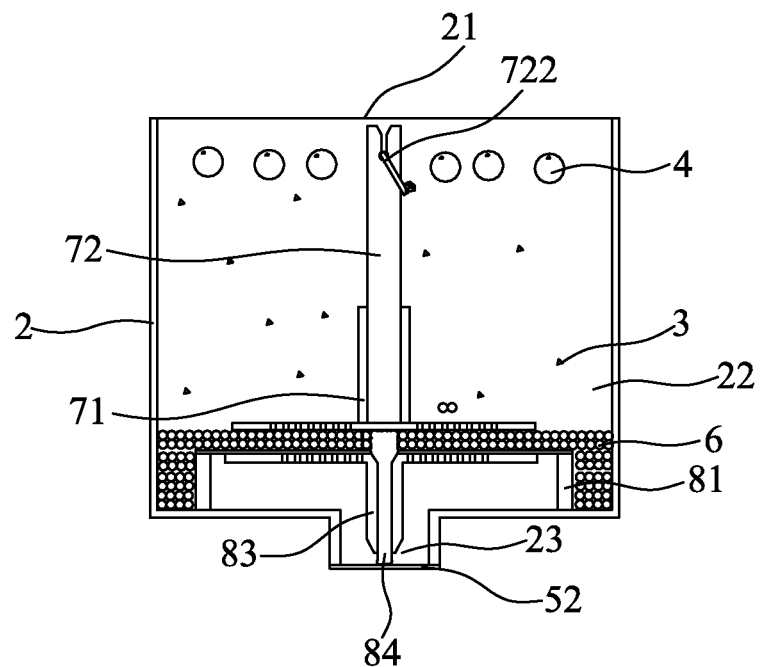

9. as shown in FIG. 17i, placing plant seeds 4 in the soil 3.

Figure 17J:
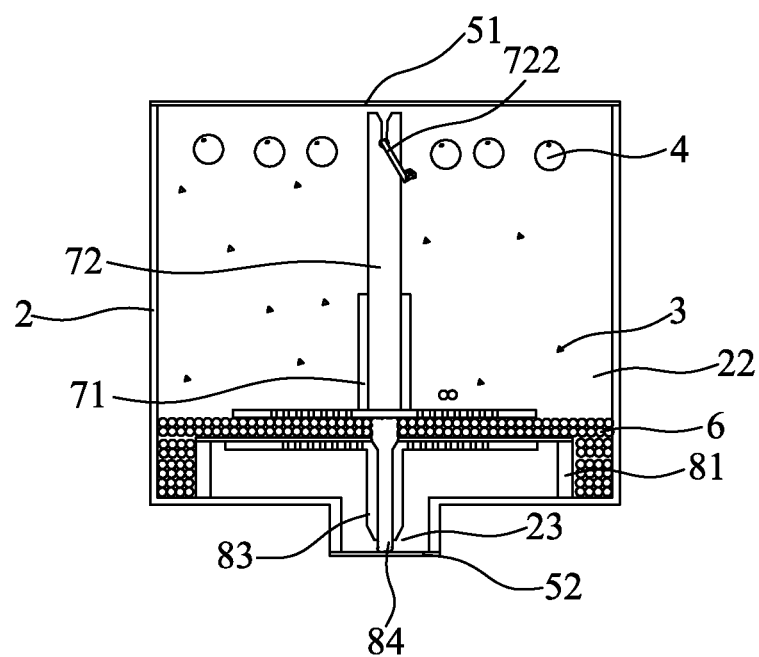

10. as shown in FIG. 17j, sealing the opening 21 of the second cavity 22 of the inner shell 2 with a first water-permeable layer 51.

Figure 17K:
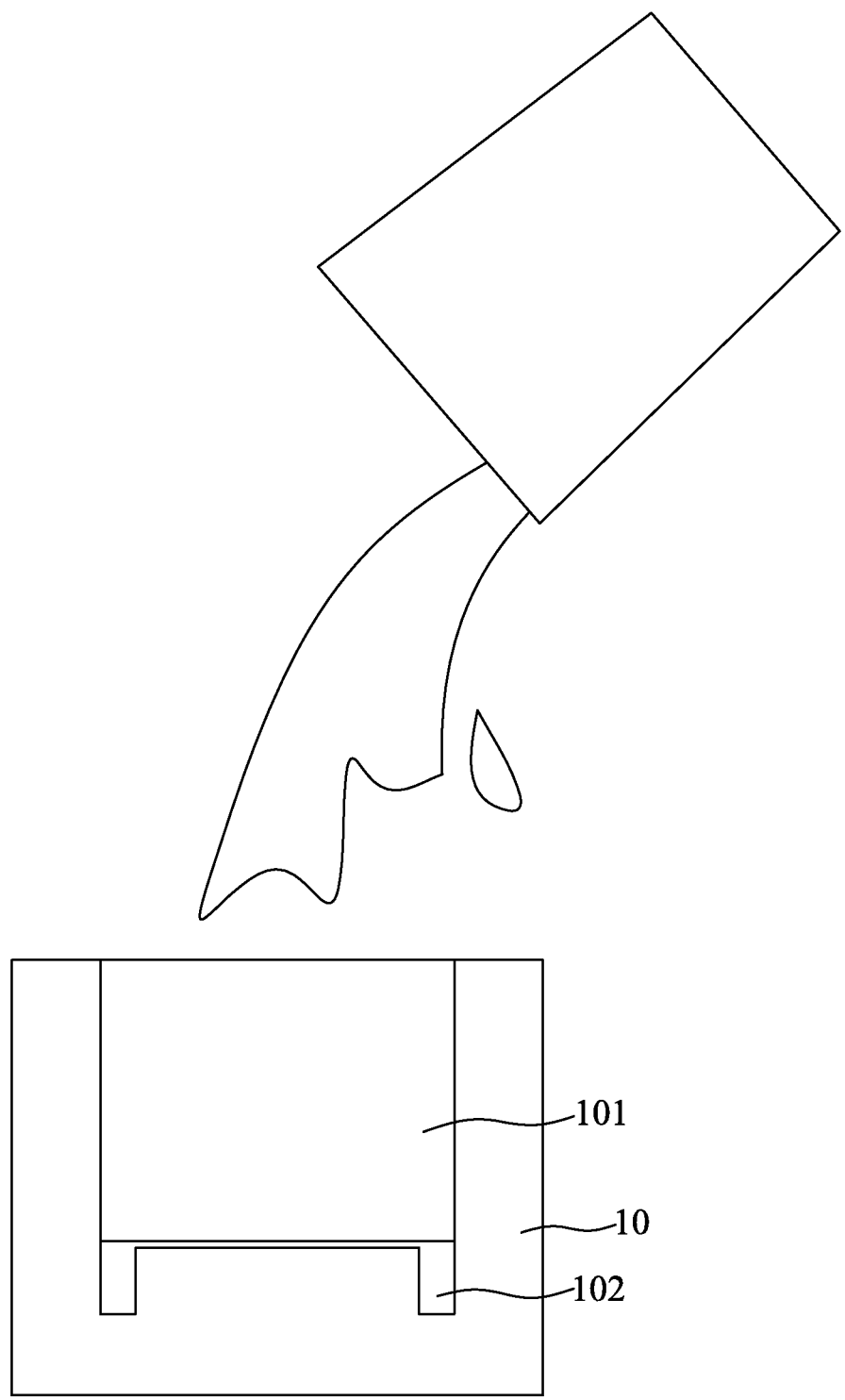

11. as shown in FIG. 17k, providing a mold 10 having a cavity 101, wherein a recess 102 is formed around a bottom of the cavity 101, slurry is poured into the cavity 101 to cover the bottom of the cavity 101 and the recess 102 to form a seepage layer 12 and a retaining wall 13 around an outer side of the seepage layer 12 after the slurry is solidified, and a water storage trough 14 is formed between the retainer wall 13 and the seepage layer 12.

Figure 17L:
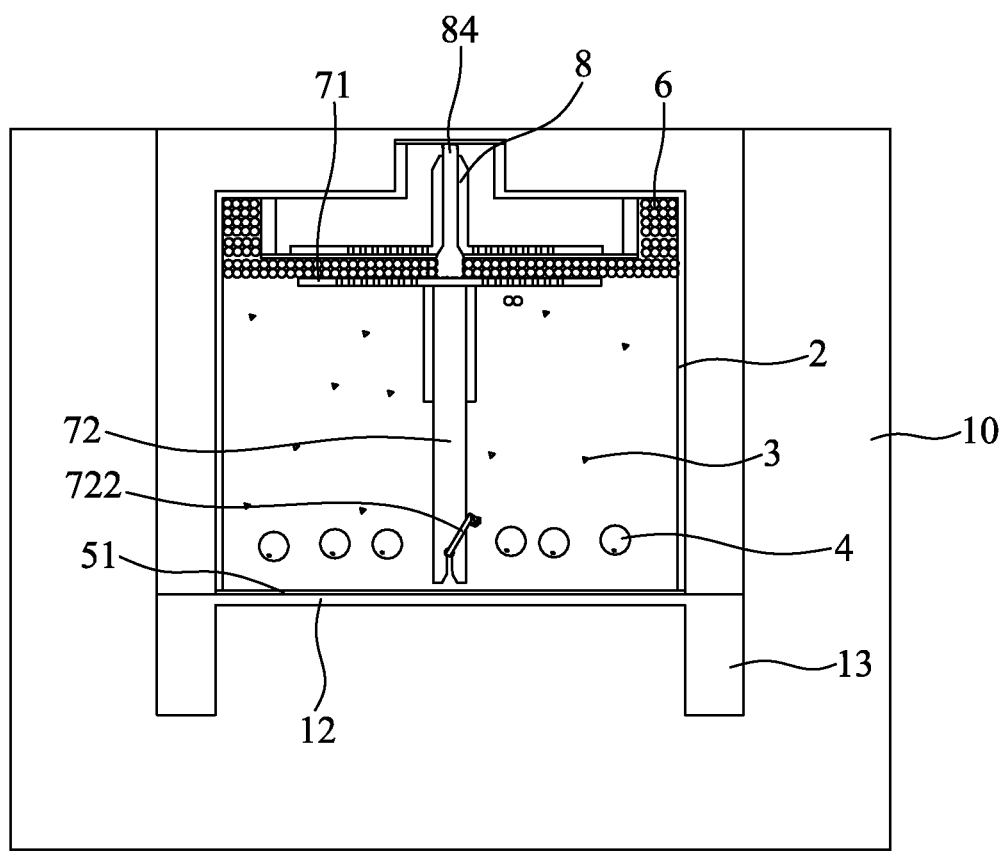

12. as shown in FIG. 17l, placing the inner shell 2 upside down in the cavity 101 of the mold 10, wherein the first water-permeable layer 51 of the inner shell 2 faces the seepage layer 12, a gap is formed between a side portion of the inner shell 2 and the cavity 101, and an upper portion of the inner shell 2 is lower than a mouth portion of the cavity 101.

Figure 17M:
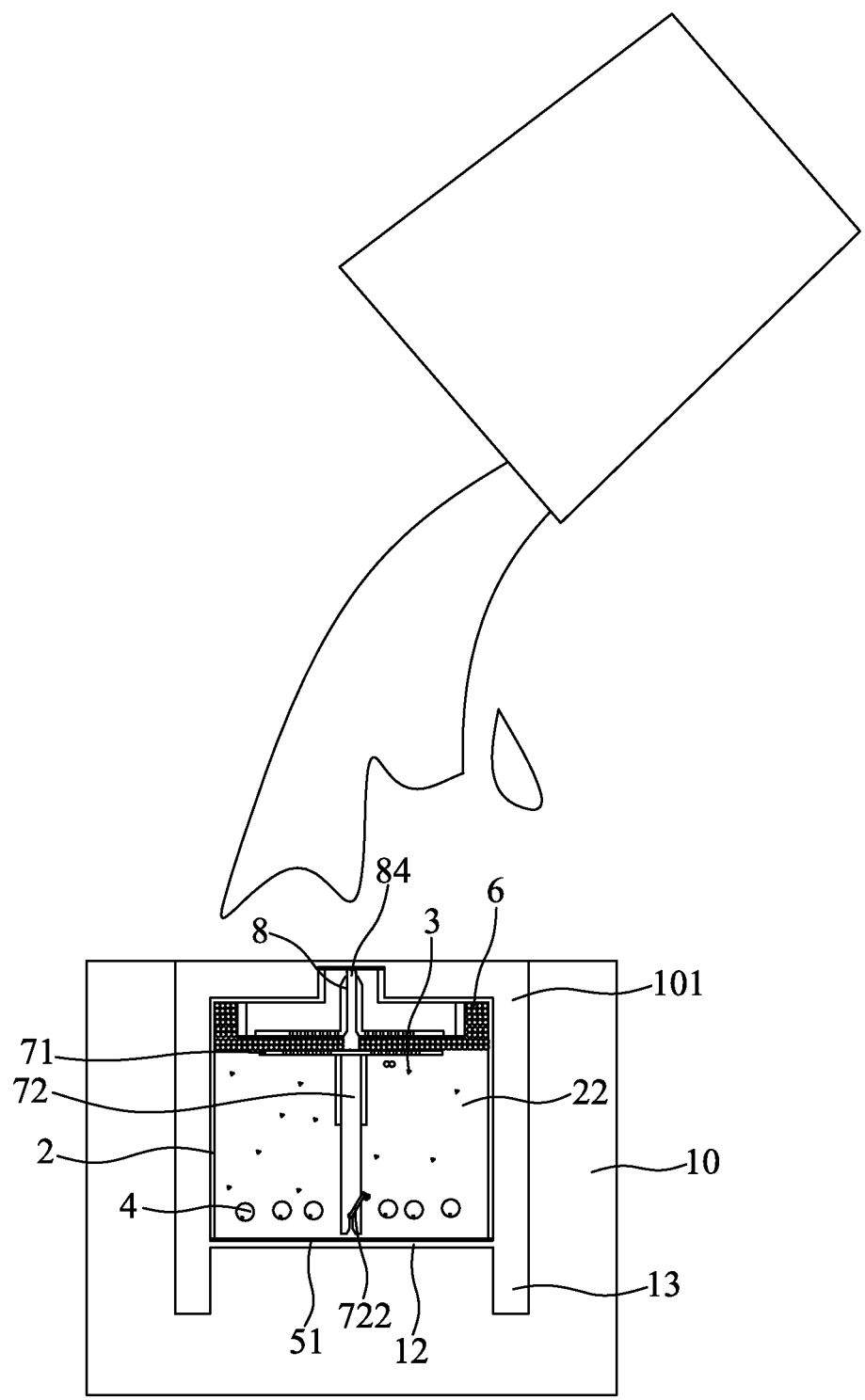

13. as shown in FIG. 17m, pouring slurry into the gap between the side portion of the inner shell 2 and the cavity 101 until the inner shell 2 is covered with the slurry, wherein the slurry after solidified and the seepage layer 12 jointly form an outer shell 1, after the mold is removed, the planting device is completed as shown in FIG. 15.

Figure 18C:
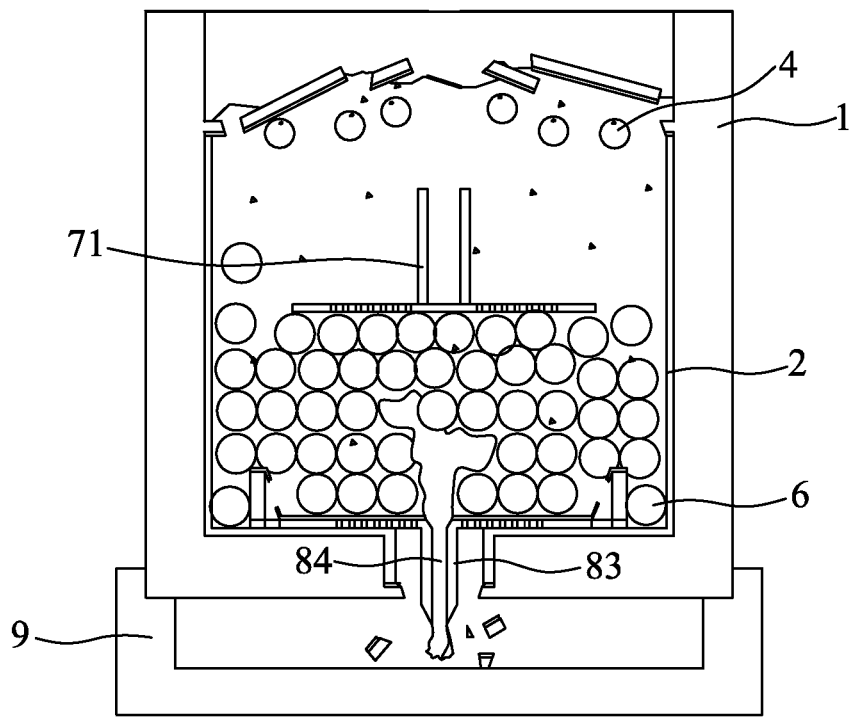
Figure 18D:
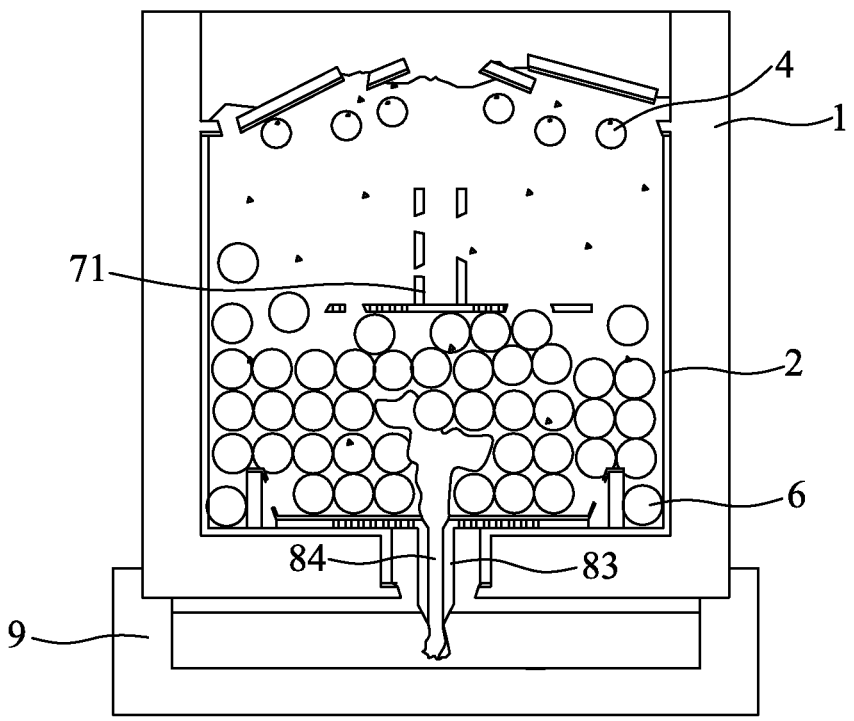
Figure 18E:
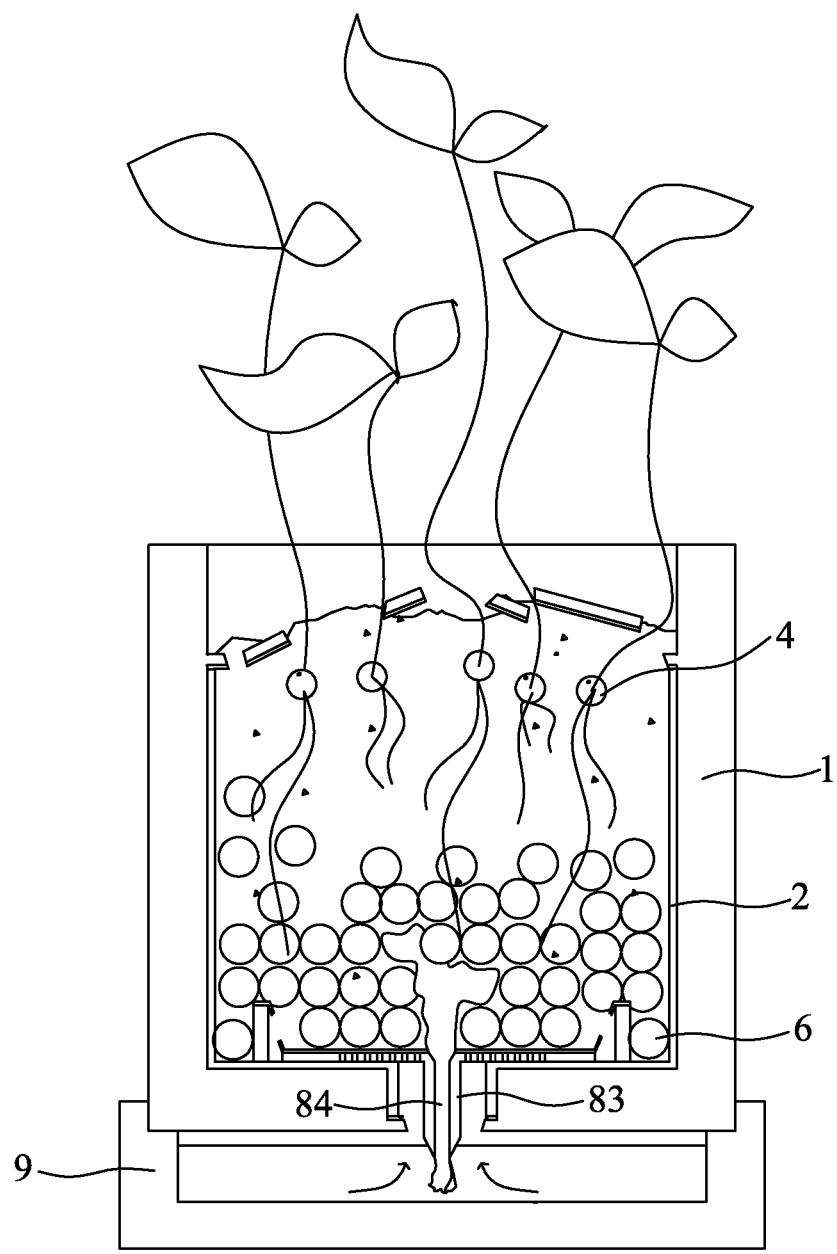

For planting, the water is poured into the water storage trough 14 and the water is infiltrated into the soil 3, as shown in FIG. 18a. After the water-absorbing expandable material (the water-absorbing expandable layer 6) sufficiently absorbs the water, it begins to expand to push the first shell-breaking structure 7 upward and to push the second shell-breaking structure 8 downward simultaneously. The strength of the paper holder of the second shell-breaking structure 8 sharp decreases when meeting the water, so it is first broken. The first shell-breaking structure 7 continues to move upward to apply pressure, and the second shell-breaking structure 8 continues to move downward to apply pressure. The first shell-breaking structure 7 is provided with the pendant 722, such as a ring or other small articles, to pierce the seepage layer 12. The second shell-breaking structure 8 pierces the bottom of the recess 15 of the outer shell 1. Two ends of the fiber bar 85 in the second shell-breaking bar 83 of the second shell-breaking structure 8 absorb water to expand, as shown in FIG. 18b. After breaking the shell, the first shell-breaking bar 72 can be directly removed from the shell or slowly decomposed, as shown in FIG. 18c. After a period of time, the first tray 71 begins to decompose, as shown in FIG. 18d. After a period of time, the plants grow to form small potted plants. The water-absorbing expandable layer 6 (highly hydrophilic resin) is environmentally friendly and biodegradable and has a strong water retention effect, so that it can provide moisture for the soil for a long time, and there is a lot of space between each other for the growth of plant roots to provide a sufficient amount of air. When the soil 3 is relatively dry, the water-absorbing fibers absorb water from the water storage tray 9 to prolong the watering time, as shown in FIG. 18e.

The fifth embodiment is provided with the fiber water-absorbing structure, enabling the planting device to enhance water retention and to reduce the number of watering.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A planting device, comprising:
   an outer shell, the outer shell being formed with a closed first cavity therein;
   an inner shell, being disposed in the first cavity, the inner shell being formed with a second cavity having an opening, the second cavity being filled with soil, plant seeds being placed in the soil, the opening of the second cavity being sealed with a first water-permeable layer;
   a seepage layer being opposite the opening of the second cavity; and
   a retaining wall being provided around an outer side of the seepage layer to form a water storage trough;
   wherein a bottom of the second cavity of the inner shell is provided with a water-absorbing expandable layer, and the soil is filled on the water-absorbing expandable layer; a first shell-breaking structure being disposed on the water-absorbing expandable layer, the first shell-breaking structure pointing to the seepage layer of the outer shell; the first shell-breaking structure is composed of a first tray and a first shell-breaking bar, the first tray is disposed on the water-absorbing expandable layer, the first shell-breaking bar is mounted on the first tray, and the first shell-breaking bar points to the seepage layer of the outer shell.

2. The planting device as claimed in claim 1, wherein the water-absorbing expandable layer is made of a hydrophilic resin or compressed fibre-reinforced soil.

3. The planting device as claimed in claim 1, wherein the first tray is provided with a first sleeve, and the first shell-breaking bar is inserted in the first sleeve.

4. The planting device as claimed in claim 1, wherein one end of the first shell-breaking bar, facing the seepage layer of the outer shell, is a pointed end.

5. The planting device as claimed in claim 1, further comprising a second shell-breaking structure and a bracket, the second shell-breaking structure being mounted on the bracket, one side of the second shell-breaking structure pointing to a bottom of the first cavity of the outer shell and the bottom of the second cavity of the inner shell, another side of the second shell-breaking structure being provided with the water-absorbing expandable layer, the bracket being disposed at the bottom of the second cavity of the inner shell.

6. The planting device as claimed in claim 5, wherein the second shell-breaking structure is composed of a second tray, a second shell-breaking bar and a paper holder, the second shell-breaking bar is disposed on one side of the second tray, another side of the second tray is fixed to the paper holder, the second shell-breaking bar points to the bottom of the first cavity of the outer shell and the bottom of the second cavity of the inner shell, the paper holder is secured on the bracket, and the water-absorbing expandable layer is disposed on the paper holder.

7. The planting device as claimed in claim 6, wherein the bottom of the second cavity of the inner shell protrudes downward and is provided with a drain mouth, the drain mouth is sealed with a second water-permeable layer, the bottom of the first cavity of the outer shell is provided with a recess, the drain mouth of the inner shell is located in the recess of the outer shell, and the second shell-breaking bar is located in the drain mouth of the inner shell.

8. The planting device as claimed in claim 7, further comprising a water storage tray, the water storage tray being mounted to a lower portion of the outer shell, facing the second shell-breaking structure.

9. The planting device as claimed in claim 6, wherein the second shell-breaking bar has a hollow passage therein, and a fiber bar is inserted in the hollow passage.

10. The planting device as claimed in claim 6, wherein one end of the second shell-breaking bar, pointing to the bottom of the first cavity of the outer shell and the bottom of the second cavity of the inner shell, is a pointed end.

11. The planting device as claimed in claim 6, wherein one end of the first shell-breaking bar, pointing to the seepage layer of the outer shell, is provided with a pendant.

12. The planting device as claimed in claim 1, wherein the first water-permeable layer is made of a water-permeable fiber material, the outer shell and the seepage layer are made of a cement or gypsum material, and the inner shell is made of a fibrous synthetic material.

* * * * *